US011711193B2

(12) United States Patent
Papasakellariou

(10) Patent No.: US 11,711,193 B2
(45) Date of Patent: Jul. 25, 2023

(54) ENHANCEMENTS TO RECEPTION RELIABILITY FOR DATA AND CONTROL INFORMATION

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/445,185

(22) Filed: Aug. 16, 2021

(65) Prior Publication Data

US 2021/0376988 A1 Dec. 2, 2021

Related U.S. Application Data

(63) Continuation of application No. 16/449,252, filed on Jun. 21, 2019, now Pat. No. 11,095,415.

(Continued)

(51) Int. Cl.
*H04W 72/04* (2023.01)
*H04L 5/00* (2006.01)
(Continued)

(52) U.S. Cl.
CPC ............ *H04L 5/0055* (2013.01); *H04L 5/001* (2013.01); *H04L 5/0042* (2013.01); *H04W 72/044* (2013.01); *H04W 72/23* (2023.01)

(58) Field of Classification Search
CPC ........... H04W 72/0446; H04W 72/042; H04W 72/0466; H04W 72/0413; H04W 72/044;
(Continued)

(56) References Cited

U.S. PATENT DOCUMENTS 9,572,063 B2 2/2017 Etemad et al.
9,794,913 B2 * 10/2017 Lee ........................ H04W 72/04
(Continued)

FOREIGN PATENT DOCUMENTS

WO 2018084604 A1 5/2018

OTHER PUBLICATIONS

"3rd Generation Partnership Project; Technical Specification Group Radio Access Network; Evolved Universal Terrestrial Radio Access (E-UTRA); Physical channels and modulation (Release 15)", 3GPP TS 36.211 V15.3.0, Sep. 2018, 237 pages.

(Continued)

*Primary Examiner* — Wei Zhao

(57) ABSTRACT

Enhancing reception reliability for control information or data information includes receiving: a first configuration for a CORESET and a second configuration for a second CORESET; a first PDCCH, in the first CORESET or the second CORESET, including a first DCI format; and a first PDSCH, scheduled by the first DCI format, including a TB. The method further includes transmitting a first PUCCH including a first HARQ-ACK codebook and a second PUCCH including a second HARQ-ACK codebook. HARQ-ACK information, in response to receiving the TB, is included in: the first HARQ-ACK codebook when the first PDCCH is received in the first CORESET and the second HARQ-ACK codebook when the first PDCCH is received in the second CORESET.

20 Claims, 19 Drawing Sheets

Related U.S. Application Data

(60) Provisional application No. 62/698,753, filed on Jul. 16, 2018, provisional application No. 62/692,910, filed on Jul. 2, 2018.

(51) Int. Cl.
*H04W 72/044* (2023.01)
*H04W 72/23* (2023.01)

(58) Field of Classification Search
CPC ... H04L 5/0057; H04L 5/0055; H04L 5/0042; H04L 5/001; H04L 5/005; H04L 27/36
See application file for complete search history.

(56) References Cited

U.S. PATENT DOCUMENTS

| | | | |
|---|---|---|---|
| 2015/0208392 A1* | 7/2015 | Park | H04W 72/042 370/329 |
| 2017/0367046 A1 | 12/2017 | Papasakellariou | |
| 2018/0042028 A1 | 2/2018 | Nam et al. | |
| 2019/0174466 A1* | 6/2019 | Zhang | H04L 5/005 |
| 2019/0268208 A1 | 8/2019 | Seo et al. | |

OTHER PUBLICATIONS

"3rd Generation Partnership Project;Technical Specification Group Radio Access Network; Evolved Universal Terrestrial Radio Access (E-UTRA); Multiplexing and channel coding(Release 15)", 3GPP TS 36.212 V15.3.0, Sep. 2018, 247 pages.

"3rd Generation Partnership Project; Technical Specification Group Radio Access Network; Evolved Universal Terrestrial Radio Access (E-UTRA); Physical layer procedures (Release 15)", 3GPP TS 36.213 V15.3.0, Sep. 2018, 546 pages.

"3rd Generation Partnership Project;Technical Specification Group Radio Access Network; Evolved Universal Terrestrial Radio Access (E-UTRA); Physical layer;Measurements(Release 15)", 3GPP TS 36.214 V15.3.0, Sep. 2018, 25 pages.

"3rd Generation Partnership Project;Technical Specification Group Radio Access Network; Evolved Universal Terrestrial Radio Access (E-UTRA); Medium Access Control (MAC) protocol specification (Release 15)", 3GPP TS 36.321 V15.3.0, Sep. 2018, 127 pages.

"LTE; Evolved Universal Terrestrial Radio Access (E-UTRA); Radio Resource Control (RRC); Protocol specification ", 3GPP TS 36.331 version 15.3.0 Release 15, Oct. 2018, 916 pages.

Huawei, HiSilicon, "Solution and TP for multi-TRP PDCCH transmission", 3GPP TSG RAN WG1 Ad Hoc Meeting, Jan. 22-26, 2018, R1-1800824, 5 pages.

Oppo, "Summary of offline discussion on PUCCH resource allocation", 3GPP TSG RAN WG1 Meeting #93, May 21-25, 2018, R1-1807863, 11 pages.

"3rd Generation Partnership Project; Technical Specification Group Radio Access Network; NR; Physical layer procedures for data (Release 15)", 3GPP TS 38.214 V15.2.0 (Jun. 2018), 95 pages.

International Search Report dated Oct. 8, 2019 in connection with International Patent Application No. PCT/KR2019/007917, 3 pages.

Written Opinion of the International Searching Authority dated Oct. 8, 2019 in connection with International Patent Application No. PCT/KR2019/007917, 4 pages.

Extended European Search Report regarding Application No. 19830138. 4, dated Jul. 6, 2021, 12 pages.

Huawei et al., "Remaining issues on NR CA", 3GPP TSG RAN WG1 Meeting #93, R1-1805895, May 2018, 9 pages.

"3rd Generation Partnership Project; Technical Specification Group Radio Access Network; NR; Physical layer procedures for control (Release 15)", 3GPP TS 38.213 V15.2.0, Jun. 2018, 98 pages.

Korean Intellectual Property Office, Office Action dated Jan. 16, 2023 regarding Application No. 10-2020-7037148, 9 pages.

Ericsson, "On multi TRP and multi panel", 3GPP TSG RAN WG1 Meeting RAN1#97, R1-1907697, May 2019, 23 pages.

Qualcomm Incorporated, "Multi-TRP Enhancements", 3GPP TSG-RAN WG1 Meeting #97, R1-1907289, May 2019, 25 pages.

Oppo, "Enhancements on multi-TRP and multi-panel transmission", 3GPP TSG RAN WG1 Meeting #97, R1-1906287, May 2019, 11 pages.

* cited by examiner

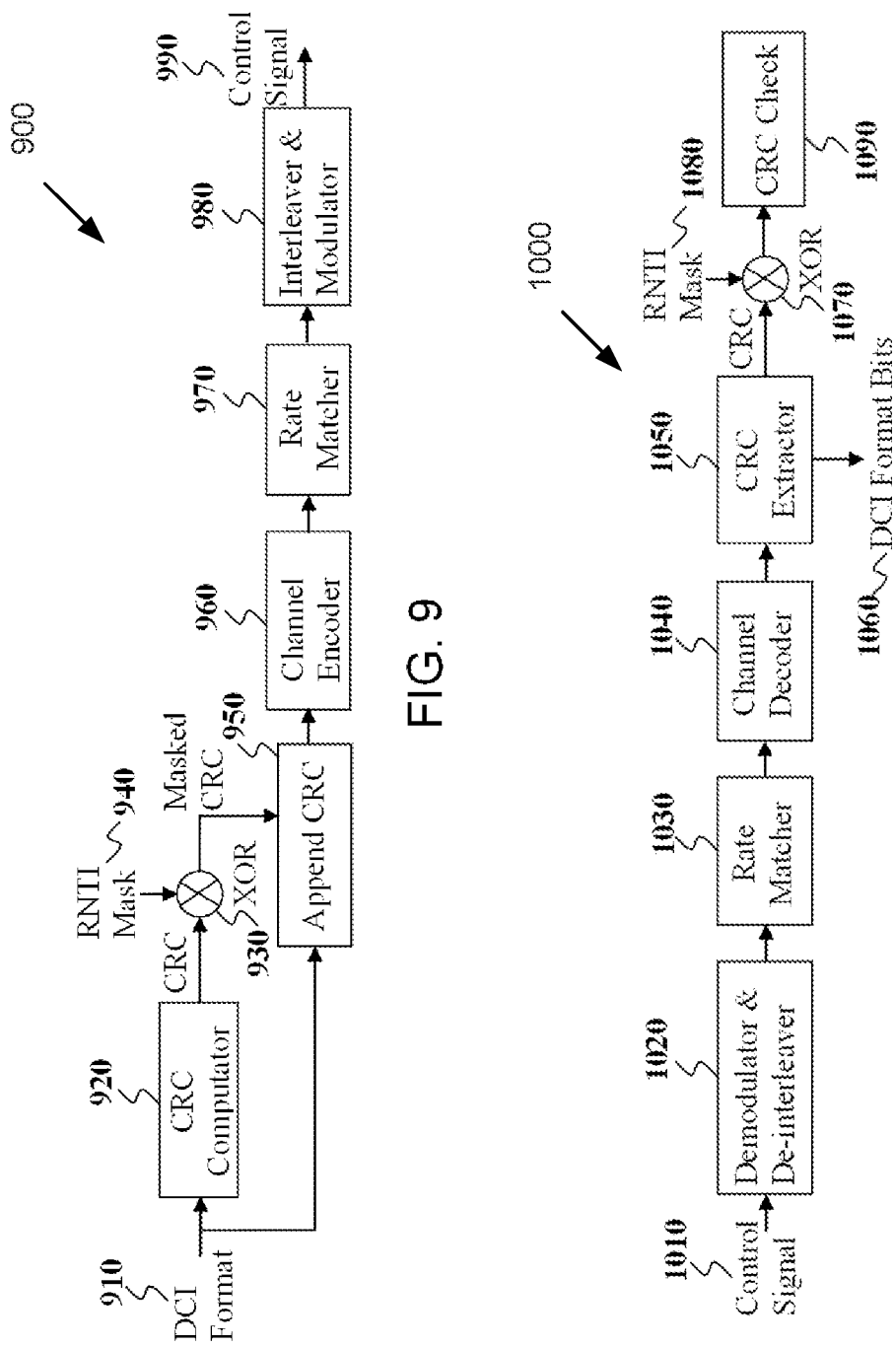

ENHANCEMENTS TO RECEPTION RELIABILITY FOR DATA AND CONTROL INFORMATION

CROSS-REFERENCE TO RELATED APPLICATIONS AND CLAIM OF PRIORITY

This application is a continuation of U.S. Non-Provisional patent application Ser. No. 16/449,252 filed on Jun. 21, 2019, now U.S. Pat. No. 11,095,415, and claims priority to: U.S. Provisional Patent Application No. 62/692,910 filed on Jul. 2, 2018; and U.S. Provisional Patent Application No. 62/698,753 filed on Jul. 16, 2018. The content of the above-identified patent document is incorporated herein by reference.

TECHNICAL FIELD

The present application relates generally to wireless communication systems, more specifically, this disclosure relates to enhance reception reliability for control information or data information.

BACKGROUND

The present disclosure relates to a pre-$5^{th}$-Generation (5G) or 5G communication system to be provided for supporting higher data rates beyond $4^{th}$-generation (4G) communication system such as long term evolution (LTE). The present disclosure relates to enabling or disabling multiplexing of UCI in a PUSCH depending on a target block error (BLER) for the data information in the PUSCH or depending on a target BLER or payload of the UCI. The present disclosure also relates to supporting multiplexing in a PUSCH or PUCCH of different UCI of the same type or different type having different target BLERs. The present disclosure additionally relates to reducing a probability of collision between a PUSCH transmission and a PUCCH transmission from a UE. The present disclosure further relates to enabling PDCCH DTX detection when a gNB expects transmission of HARQ-ACK information in a PUSCH. The present disclosure also relates to enable a reception of the same transport block from different cells and providing feedback for associated HARQ-ACK information. The present disclosure also relates to determining prioritization for power allocations to various transmissions according to respective BLERs for data information or UCI.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide transmission structures and format in advanced communication systems.

In one embodiment, a method is provided. The method comprises receiving: a first configuration for a first control resource set (CORESET) and a second configuration for a second CORESET, a first physical downlink control channel (PDCCH), in the first CORESET or the second CORESET, including a first downlink control information (DCI) format; and a first physical downlink shared channel (PDSCH), scheduled by the first DCI format, including a transport block (TB). The method further comprises transmitting a first physical uplink control channel (PUCCH) including a first hybrid automatic repeat request acknowledgement (HARQ-ACK) codebook and a second PUCCH including a second HARQ-ACK codebook. HARQ-ACK information in response to receiving the TB is included in: the first HARQ-ACK codebook when the first PDCCH is received in the first CORESET and the second HARQ-ACK codebook when the first PDCCH is received in the second CORESET.

In another embodiment, a user equipment (UE) is provided. The UE comprises a receiver configured to receive: a first configuration for a CORESET and a second configuration for a second CORESET; a first PDCCH, in the first CORESET or the second CORESET, including a first DCI format; and a first PDSCH, scheduled by the first DCI format, including a TB. The UE further comprises a transmitter configured to transmit a first PUCCH including a first HARQ-ACK codebook and a second PUCCH including a second HARQ-ACK codebook. HARQ-ACK information in response to receiving the TB is included in: the first HARQ-ACK codebook when the first PDCCH is received in the first CORESET and the second HARQ-ACK codebook when the first PDCCH is received in the second CORESET.

In yet another embodiment, a base station is provided. The base station comprises a transmitter configured to transmit: a first configuration for a first CORESET and a second configuration for a second CORESET; a first PDCCH, in the first CORESET or the second CORESET, including a first DCI format, and a first PDSCH, scheduled by the first DCI format, including a TB. The base station further comprises a receiver configured to receive a first PUCCH including a first HARQ-ACK codebook and a second PUCCH including a second HARQ-ACK codebook. HARQ-ACK information in response to transmitting the TB is included in: the first HARQ-ACK codebook when the first PDCCH is transmitted in the first CORESET and the second HARQ-ACK codebook when the first PDCCH is transmitted in the second CORESET.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates an example encoding process for a DCI format according to embodiments of the present disclosure;

FIG. 10 illustrates an example decoding process for a DCI format for use with a UE according to embodiments of the present disclosure;

DETAILED DESCRIPTION

FIG. 1 through FIG. 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v15.3.0, "NR; Physical channels and modulation;" 3GPP TS 36.212 v15.3.0, "NR; Multiplexing and Channel coding;" 3GPP TS 36.213 v15.3.0, "NR; Physical Layer Procedures for Control;" 3GPP TS 36.214 v15.3.0, "NR; Physical Layer Procedures for Data;" 3GPP TS 36.321 v15.3.0, "NR; Medium Access Control (MAC) protocol specification;" and 3GPP TS 36.331 v15.3.0, "NR; Radio Resource Control (RRC) Protocol Specification."

Figure 1:
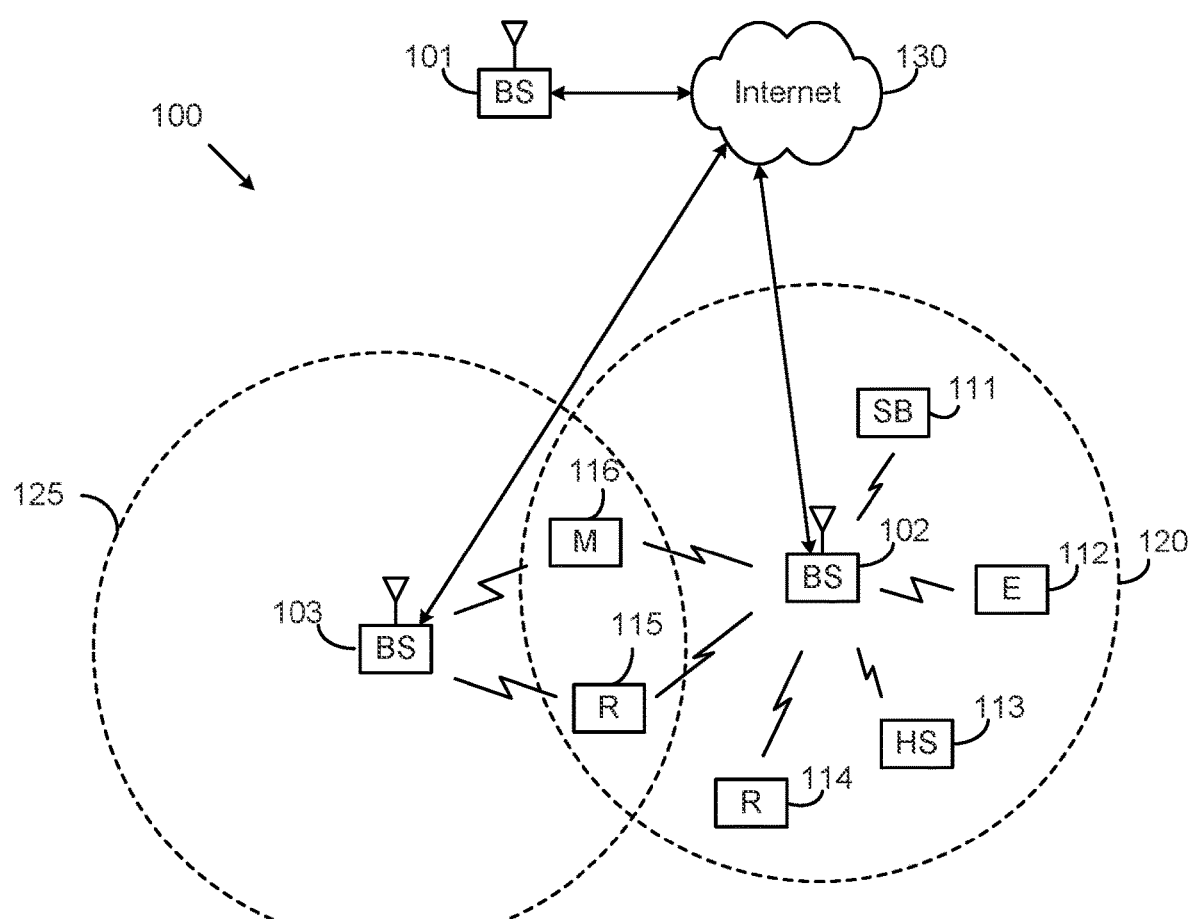
FIG. 1 illustrates an example wireless network according to embodiments of the present disclosure.
Figure 2:
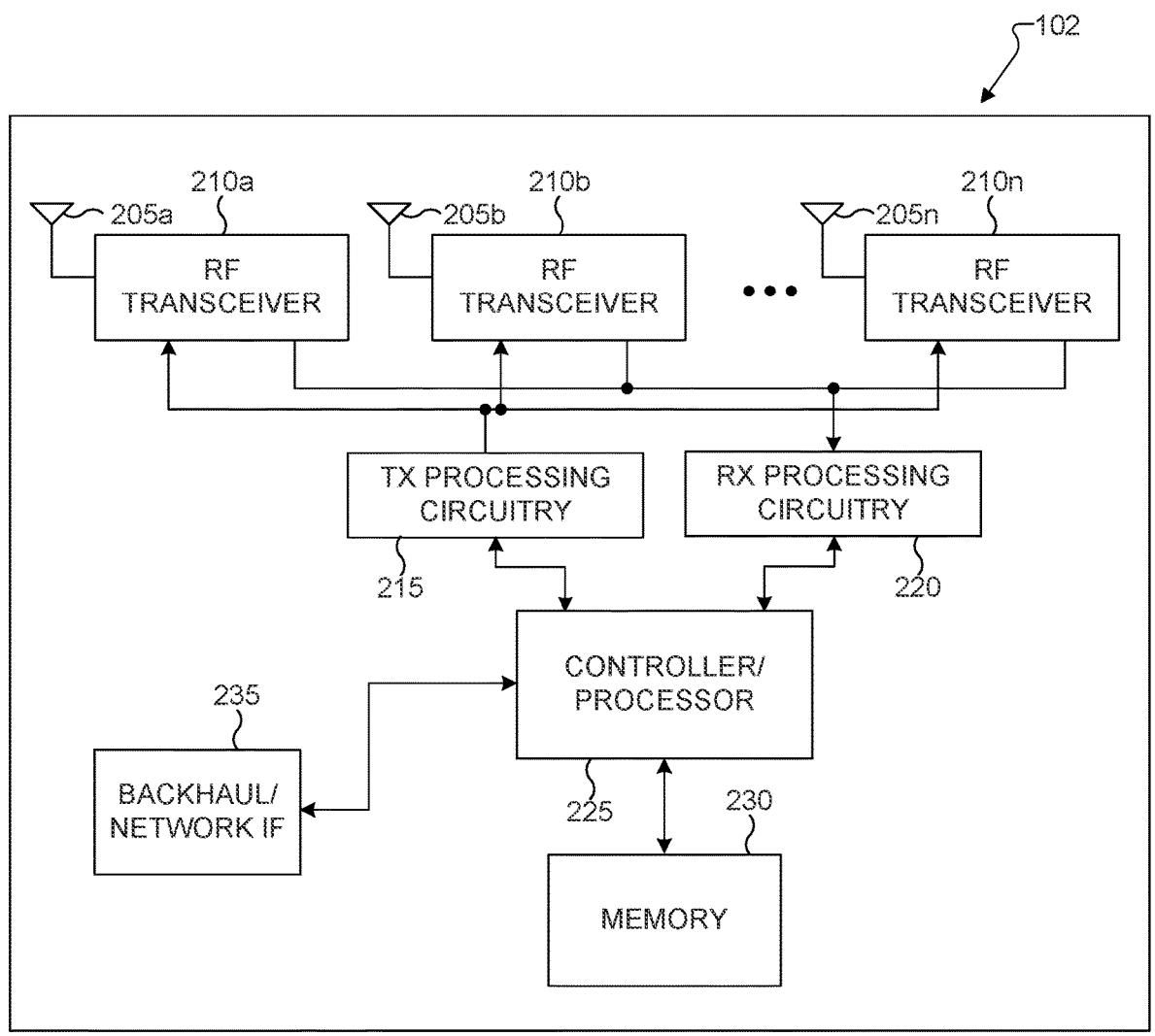
FIG. 2 illustrates an example gNB according to embodiments of the present disclosure.
Figure 3:
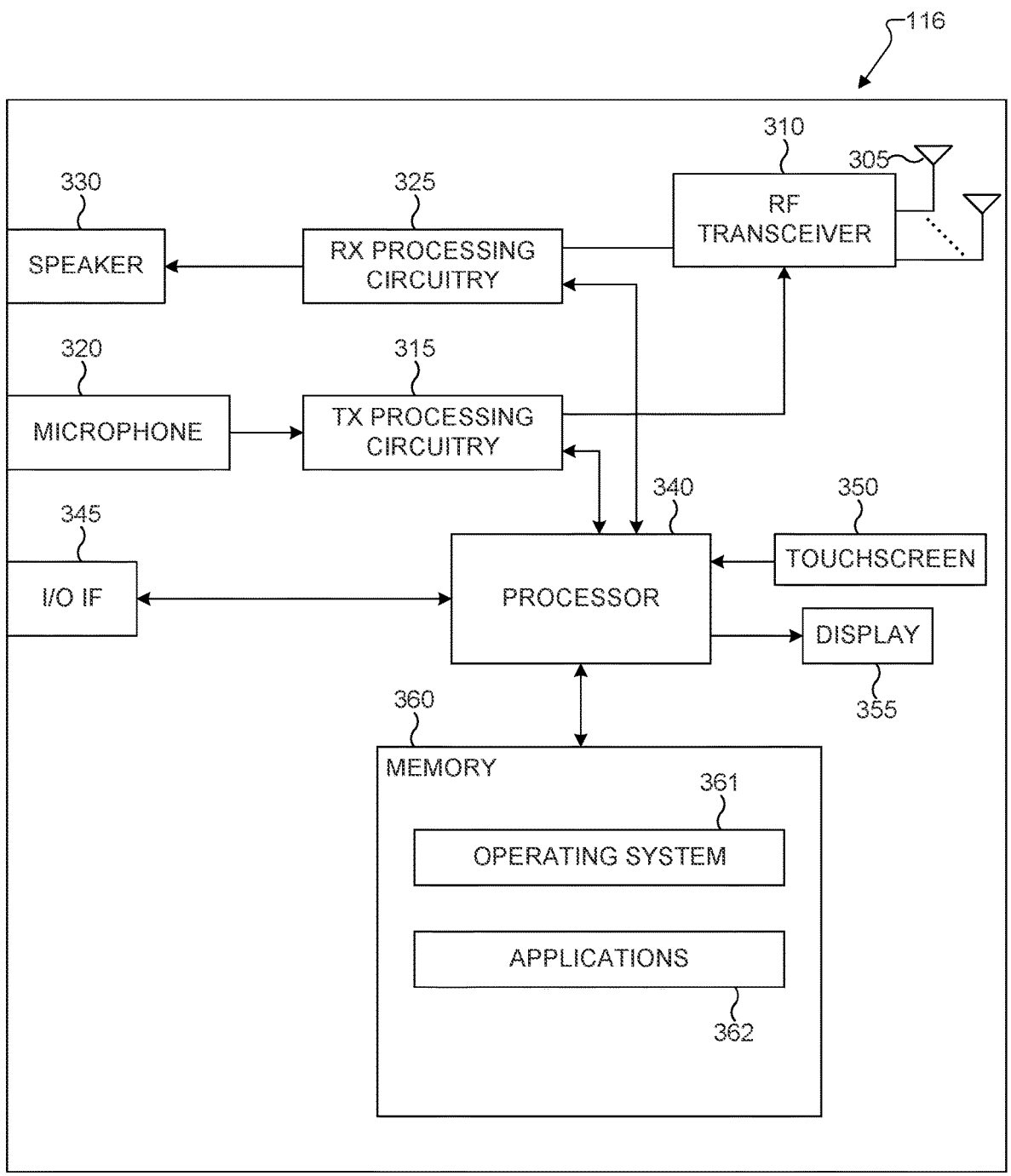
FIG. 3 illustrates an example UE according to embodiments of the present disclosure.

FIGS. 1-4 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for reception reliability for data and control information in an advanced wireless communication system. In certain embodiments, and one or more of the gNBs 101-103 includes circuitry, programming, or a combination thereof, for efficient reception reliability for data and control information in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to improving a PDCCH reception reliability and reducing an associated signaling overhead. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A time unit for DL signaling or for UL signaling on a cell is referred to as a slot and can include one or more slot symbols. A slot symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 7 symbols or 14 symbols, respectively, and a RB can have a BW of 180 kHz or 360 kHz and include 12 SCs with inter-SC spacing of 15 KHz or 30 kHz.

DL signals include data signals conveying information content, control signals conveying DL control information (DCI), and reference signals (RS) that are also known as pilot signals. A gNB can transmit data information or DCI through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

Figure 4:
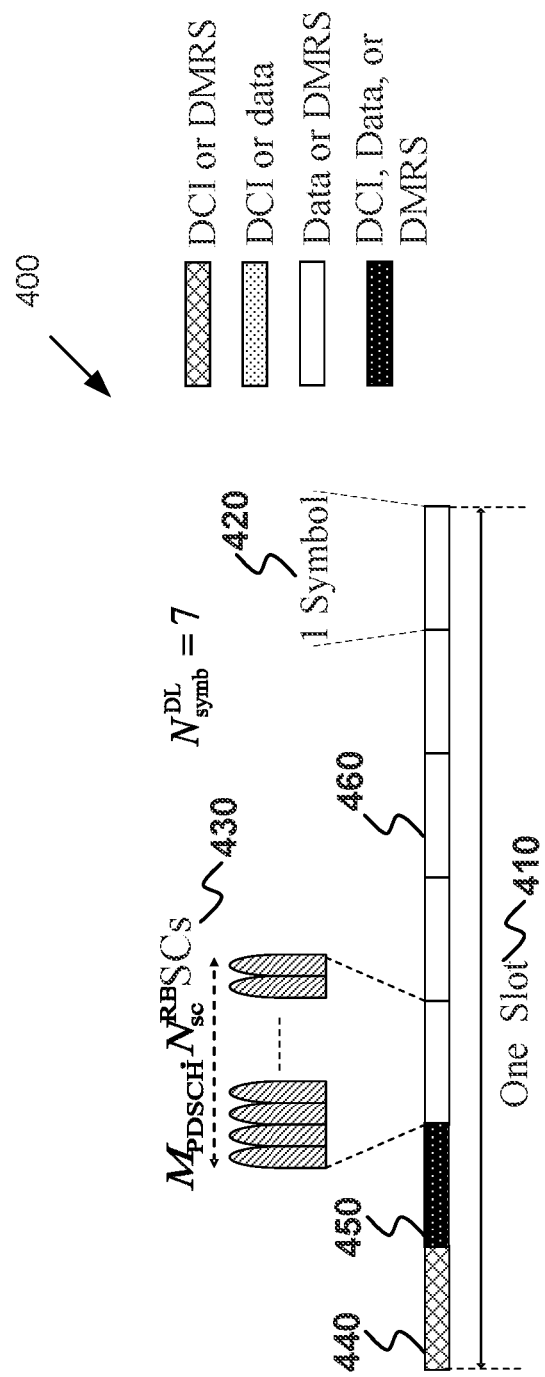
FIG. 4 illustrates an example DL slot structure for PDSCH transmission or PDCCH transmission according to embodiments of the present disclosure.

FIG. 4 illustrates an example DL slot structure 400 for PDSCH transmission or PDCCH transmission according to embodiments of the present disclosure. An embodiment of the DL slot structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

A slot 410 includes $N_{symb}^{DL}=7$ symbols 420 where a gNB transmits data information, DCI, or DMRS. A DL system BW includes $N_{RB}^{DL}$ RBs. Each RB includes $N_{sc}^{RB}$ SCs. For example, $N_{sc}^{RB}=12$. A UE is assigned $M_{PDSCH}$ RBs for a total of $M_{sc}^{PDSCH}=M_{PDSCH} \cdot N_{sc}^{RB}$ subcarriers (SCs) 430 for a PDSCH transmission BW. A PDCCH conveying DCI is transmitted over control channel elements (CCEs) that are substantially spread across the DL system BW used for PDCCH transmissions. For example, a first slot symbol 440 can be used by the gNB to transmit DCI and DMRS. A second slot symbol 450 can be used by the gNB to transmit DCI or data or DMRS. Remaining slot symbols 460 can be used by the gNB to transmit PDSCH, DMRS associated with each PDSCH, and CSI-RS. In some slots, the gNB can also transmit synchronization signals and system information.

UL signals also include data signals conveying information content, control signals conveying UL control information (UCI), and RS. A UE transmits data information or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

Figure 5:
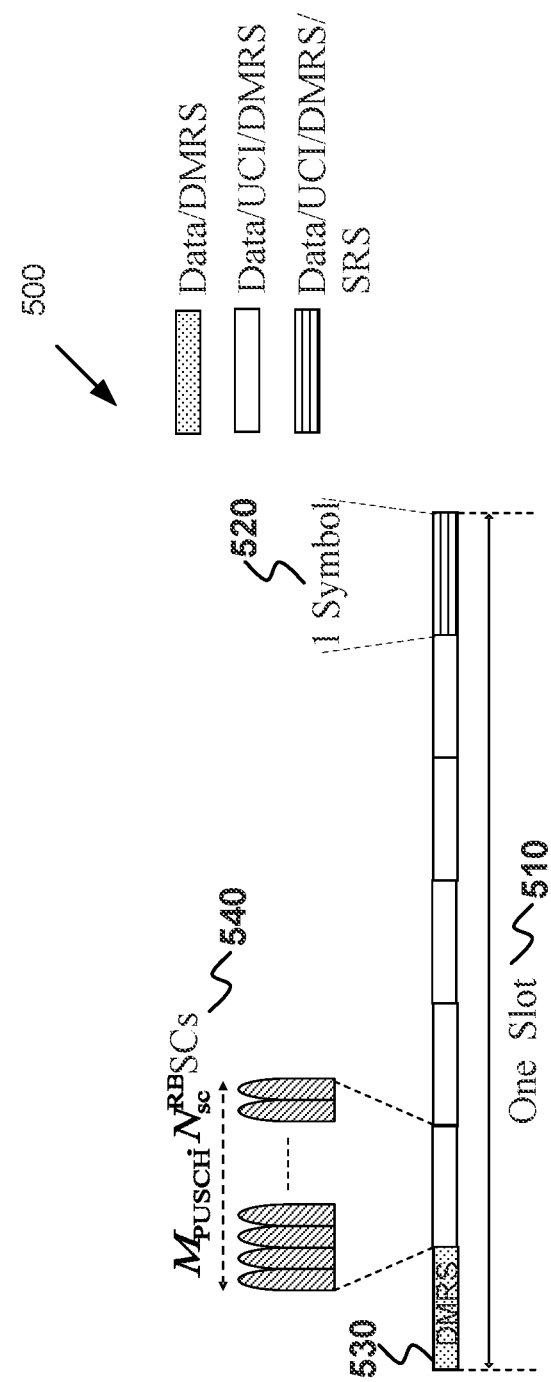
FIG. 5 illustrates an example UL slot structure for PUSCH transmission or PUCCH transmission according to embodiments of the present disclosure.

FIG. 5 illustrates an example UL slot structure 500 for PUSCH transmission or PUCCH transmission according to embodiments of the present disclosure. An embodiment of the UL slot structure 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

A slot 510 includes $N_{symb}^{UL}=7$ symbols 520 where UE transmits data information, UCI, or RS including one symbol where the UE transmits DMRS 530. An UL system BW includes $N_{RB}^{UL}$ RBs. Each RB includes $N_{sc}^{RB}$ SCs. A UE is assigned $M_{PUXCH}$ RBs for a total of $M_{sc}^{PUXCH}=M_{PUXCH} \cdot N_{sc}^{RB}$ SCs 540 for a PUSCH transmission BW ("X"="S") or for a PUCCH transmission BW ("X"="C"). A last one or more slot symbols can be used to multiplex PUCCH transmissions or SRS transmissions from one or more UEs.

A hybrid slot includes symbols for DL transmissions, one or more symbols for a guard period (GP), and symbols for UL transmissions, similar to a special SF. For example, symbols for DL transmissions can convey PDCCH and PDSCH transmissions and symbols for UL transmissions can convey PUCCH transmissions. For example, symbols for DL transmissions can convey PDCCH transmissions and symbols for an UL transmission can convey PUSCH and PUCCH transmissions.

Figure 6:
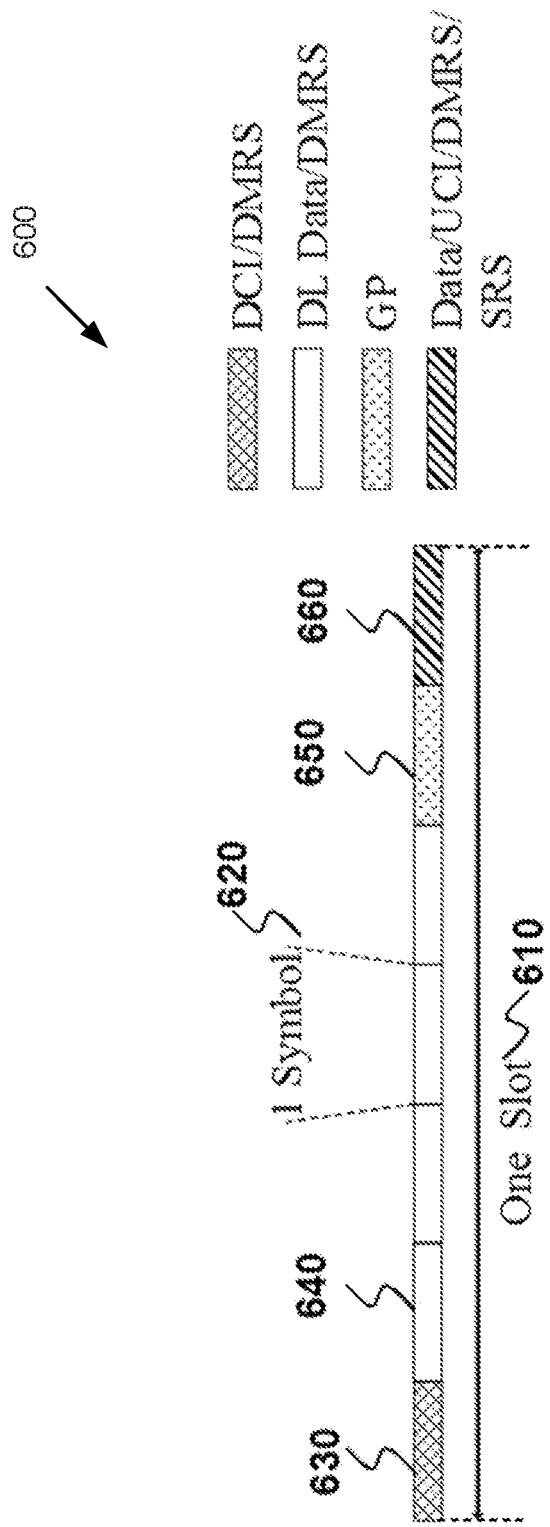
FIG. 6 illustrates an example hybrid slot structure for DL transmissions and UL transmissions according to embodiments of the present disclosure.

FIG. 6 illustrates an example hybrid slot structure 600 for DL transmissions and UL transmissions according to embodiments of the present disclosure. An embodiment of the hybrid slot structure 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A slot 610 consists of a number of symbols 620 that include a symbol for DCI transmissions and DMRS in respective PDCCHs 630, four symbols for data transmissions in respective PDSCHs 640, a GP symbol 650 to provide a guard time for the UE to switch from DL reception to UL transmission, and an UL symbol for transmitting UCI on a PUCCH 660. In general, any partitioning between DL symbols and UL symbols of a hybrid slot is possible by sliding the location of the GP symbol from the second symbol of a slot to the second to last symbol of a slot. The GP can also be shorter than one slot symbol and the additional time duration can be used for DL transmissions or for UL transmissions with shorter symbol duration. GP symbols do not need to be explicitly included in a slot structure and can be provided in practice from the gNB scheduler by not scheduling transmissions to UEs or transmissions from UEs in such symbols.

DL transmissions and UL transmissions can be based on an orthogonal frequency division multiplexing (OFDM) waveform including a variant using DFT precoding that is known as DFT-spread-OFDM.

Figure 7:
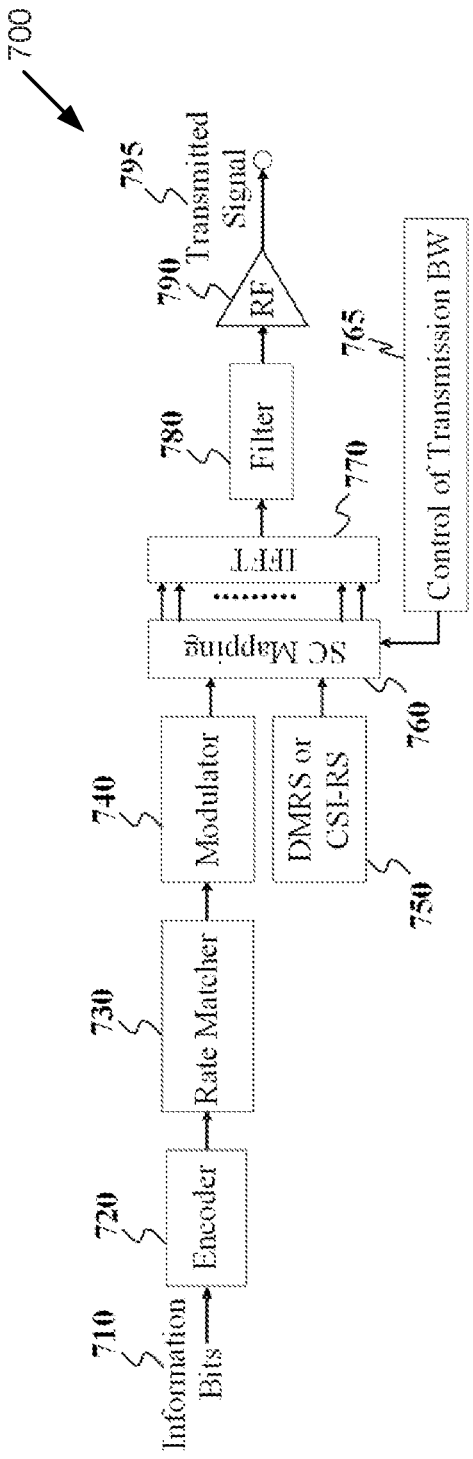
FIG. 7 illustrates an example transmitter structure using OFDM according to embodiments of the present disclosure.

FIG. 7 illustrates an example transmitter structure 700 using OFDM according to embodiments of the present disclosure. An embodiment of the transmitter structure 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 710, are encoded by encoder 720, rate matched to assigned time/frequency resources by rate matcher 730, and modulated by modulator 740. Subsequently, modulated encoded symbols and DMRS or CSI-RS 750 are mapped to SCs 760 by SC mapping unit 765, an inverse fast Fourier transform (IFFT) is performed by filter 770, a cyclic prefix (CP) is added by CP insertion unit 780, and a resulting signal is filtered by filter 790 and transmitted by a radio frequency (RF) unit 795.

Figure 8:
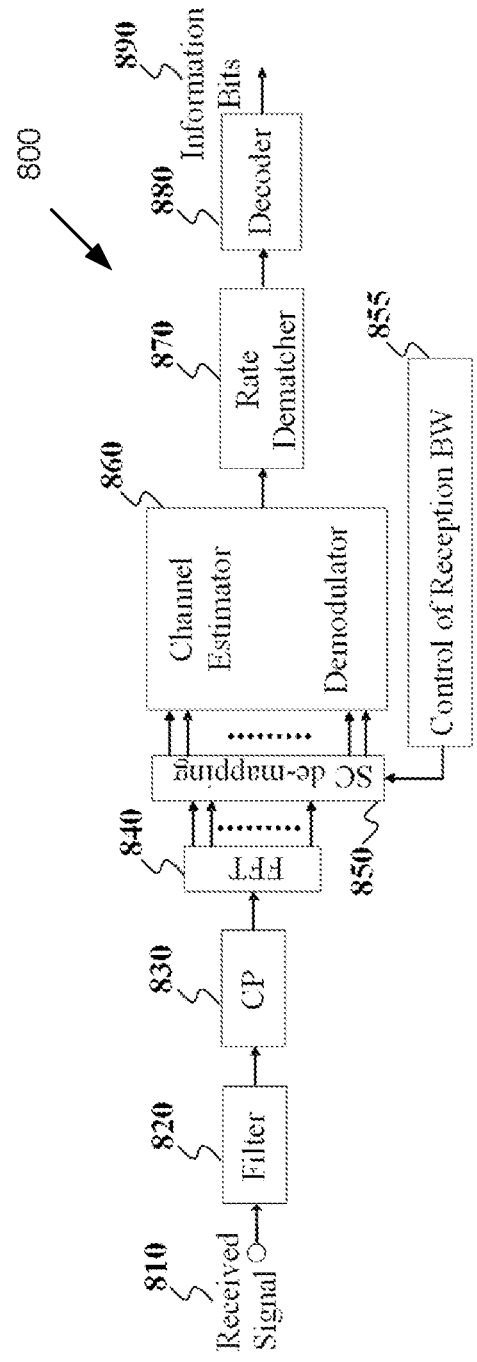
FIG. 8 illustrates an example receiver structure using OFDM according to embodiments of the present disclosure.

FIG. 8 illustrates an example receiver structure 800 using OFDM according to embodiments of the present disclosure. An embodiment of the receiver structure 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 810 is filtered by filter 820, a CP removal unit removes a CP 830, a filter 840 applies a fast Fourier transform (FFT), SCs de-mapping unit 850 de-maps SCs selected by BW selector unit 855, received symbols are demodulated by a channel estimator and a demodulator unit 860, a rate de-matcher 870 restores a rate matching, and a decoder 880 decodes the resulting bits to provide information bits 890.

A UE typically monitors multiple candidate locations for respective potential PDCCH transmissions to decode multiple candidate DCI formats in a slot. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH or a PUSCH to a single UE prior to UE establishing RRC connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. A RNTI can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission by a gNB can be in control channel elements (CCEs) that are included in a control resource set. A UE determines CCEs for a PDCCH reception based on a search space such as a UE-specific search space (USS) for PDCCH candidates with DCI format having CRC scrambled by a RNTI that is configured to the UE by UE-specific RRC signaling, and a common search space (CSS) for PDCCH candidates with DCI formats having CRC scrambled by other RNTI. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

FIG. 9 illustrates an example encoding process 900 for a DCI format according to embodiments of the present disclosure. An embodiment of the encoding process 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include 16 bits or 24 bits. The CRC of (non-coded) DCI format bits 910 is determined using a CRC computation unit 920, and the CRC is masked using an exclusive OR (XOR) operation unit 930 between CRC bits and RNTI bits 940. The XOR operation is defined as XOR(0,0)=0, XOR(0,1)=1, XOR(1,0)=1, XOR(1,1)=0. The masked CRC bits are appended to DCI format information bits using a CRC append unit 950. An encoder 960 performs channel coding (such as tail-biting convolutional coding or polar coding), followed by rate matching to allocated resources by rate matcher 970. Interleaving and modulation units 980 apply interleaving and modulation, such as QPSK, and the output control signal 990 is transmitted.

FIG. 10 illustrates an example decoding process 1000 for a DCI format for use with a UE according to embodiments of the present disclosure. An embodiment of the decoding process 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

A received control signal 1010 is demodulated and de-interleaved by a demodulator and a de-interleaver 1020. A rate matching applied at a gNB transmitter is restored by rate matcher 1030, and resulting bits are decoded by decoder 1040. After decoding, a CRC extractor 1050 extracts CRC bits and provides DCI format information bits 1060. The DCI format information bits are de-masked 1070 by an XOR operation with an RNTI 1080 (when applicable) and a CRC check is performed by unit 1090. When the CRC check succeeds (check-sum is zero), the DCI format information bits are considered to be valid. When the CRC check does not succeed, the DCI format information bits are considered to be invalid.

For HARQ-ACK multiplexing in a PUSCH that includes a transport block, a number of HARQ-ACK coded modulation symbols per layer, denoted as $Q'_{ACK}$, is determined as in Equation 1:

$$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$

$$\left. \left\lceil \alpha \cdot \sum_{l=l_0}^{N_{symb,all}^{PUSCH}-1} M_{sc}^{UCI}(l) \right\rceil \right\}$$

(Equation 1)

In Equation 1, $O_{ACK}$ is the number of HARQ-ACK information bits; if $O_{ACK} \geq 360$, $L_{ACK}=11$; otherwise $L_{ACK}$ is the number of CRC bits for HARQ-ACK information bits; $\beta_{offset}^{PUSCH} = \beta_{offset}^{HARQ-ACK}$ is provided by higher layers or indicated by a DCI format scheduling the PUSCH transmission from a set of values provided by higher layers; $C_{UL-SCH}$ is the number of code blocks for the transport block of the PUSCH transmission; $K_r$ is the r-th code block size for the transport block of the PUSCH transmission; $M_{sc}^{PUSCH}$ is the bandwidth of the PUSCH transmission, expressed as a number of subcarriers; $M_{sc}^{PT-RS}(l)$ is the number of subcarriers in symbol l that carries phase-tracking RS (PTRS), if any, in the PUSCH transmission; $M_{sc}^{UCI}(l)$ is the number of resource elements that can be used for transmission of UCI in symbol l, for l=0, 1, 2, . . . , $N_{symb,all}^{PUSCH}-1$, in the PUSCH transmission, and $N_{symb,all}^{PUSCH}$ is the total number of symbols of the PUSCH, including all symbols used for DMRS; for any symbol that carries DMRS of the PUSCH, $M_{sc}^{UCI}(l)=0$; for any symbol that does not carry DMRS of the PUSCH, $M_{sc}^{UCI}(l)=M_{sc}^{PUSCH}-M_{sc}^{PT-RS}(l)$; α is configured by higher layers; $l_0$ is the symbol index of the first symbol that does not carry DMRS of the PUSCH, after the first DMRS symbol(s), in the PUSCH transmission.

For CSI part 1 transmission on PUSCH with a transport block, a number of coded modulation symbols per layer for CSI part 1 transmission, denoted as $Q'_{CSI-part1}$, is determined as in Equation 2:

(Equation 2)

$$Q'_{CSI-1} =$$

$$\min\left\{ \left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$

$$\left. \left\lceil \alpha \cdot \sum_{l=0}^{N_{symb,all}^{PUSCH}-1} M_{sc}^{UCI}(l) \right\rceil - Q'_{ACK} \right\}$$

In Equation 2, $O_{CSI-1}$ is the number of bits for CSI part 1; if $O_{CSI-1} \geq 360$, $L_{CSI-1}=11$; otherwise $L_{CSI-1}$ is the number of CRC bits for CSI part 1; $\beta_{offset}^{PUSCH} = \beta_{offset}^{CSI-part1}$ is provided by higher layers or indicated by a DCI format scheduling the PUSCH transmission from a set of values provided by higher layers; $Q'_{ACK}$ is the number of coded modulation symbols per layer for HARQ-ACK transmitted on the PUSCH if number of HARQ-ACK information bits is more than 2, and $$Q'_{ACK} = \sum_{l=0}^{N_{symb,all}^{PUSCH}-1} \overline{M}_{sc,rvd}^{ACK}(l)$$

if the number of HARQ-ACK information bits is no more than 2 bits, where $\overline{M}_{sc,rvd}^{ACK}(l)$ is the number of reserved resource elements for potential HARQ-ACK transmission in symbol l, for l=0, 1, 2, . . . , $N_{symb,all}^{PUSCH}-1$, in the PUSCH transmission; $M_{sc}^{UCI}(l)$ is the number of resource elements that can be used for transmission of UCI in symbol l, for l=0, 1, 2, . . . , $N_{symb,all}^{PUSCH}-1$, in the PUSCH transmission and $N_{symb,all}^{PUSCH}$ is the total number of symbols of the PUSCH, including all symbols used for DMRS; for any symbol that carries DMRS of the PUSCH, $M_{sc}^{UCI}(l)=0$; for any symbol that does not carry DMRS of the PUSCH, $M_{sc}^{UCI}(l)=M_{sc}^{PUSCH}-M_{sc}^{PT-RS}(l)$.

A UE sets a power for a transmission of channel or signal, such as PUSCH, PUCCH, or SRS, with an objective to achieve a corresponding reliability target by achieving a respective target received single-to-interference and noise ratio (SINR) or a target block error rate (BLER) at a cell of a gNB while controlling interference to neighboring cells. UL power control (PC) includes open-loop PC (OLPC) with cell-specific and UE-specific parameters and closed-loop PC (CLPC) corrections provided to a UE by a gNB through transmission PC (TPC) commands. When a PUSCH transmission is scheduled by a PDCCH, a TPC command is included in a respective DCI format.

When a UE transmits a PUCCH on active UL BWP b of carrier f in the primary cell c using PUCCH power control adjustment state with index i, the UE determines the PUCCH transmission power $P_{PUCCH,b,f,c}(i,q_u,q_d,l)$ in PUCCH transmission occasion i as given by:

(Equation 3)

$$P_{PUCCH,b,f,c}(i, q_u, q_d, l) = \min\begin{cases} P_{CMAX,f,c}(i), \\ P_{O\_PUCCH,b,f,c}(q_u) + 10\log_{10}(2^{\mu} \cdot M_{RB,b,f,c}^{PUCCH}(i)) + PL_{b,f,c}(q_d) + \\ \Delta_{F\_PUCCH}(F) + \Delta_{TF,b,f,c}(i) + g_{b,f,c}(i, l) \end{cases}[dBm]$$

In Equation 3, $\Delta_{TF,b,f,c}(i)$ is a PUCCH transmission power adjustment component for UL BWP b of carrier f of primary cell c, where for a PUCCH transmission using PUCCH format 0 or PUCCH format 1, $$\Delta_{TF,b,f,c}(i) = 10\log_{10}\left(\frac{N_{ref}^{PUCCH}}{N_{symb}^{PUCCH}}\right)$$

where $N_{symb}^{PUCCH}$ is the number of PUCCH format 0 symbols or PUCCH format 1 symbols, and is provided by respective higher layer parameters. $N_{ref}^{PUCCH}=2$ for PUCCH format 0. $N_{ref}^{PUCCH}=N_{symb}^{slot}$ for PUCCH format 1.

For a PUCCH transmission using PUCCH format 2 or PUCCH format 3 or PUCCH format 4 and for a number of UCI bits smaller than or equal to 11, $\Delta_{TF,b,f,c}(i)=10 \log_{10}(K_1 \cdot (n_{HARQ-ACK}+O_{SR}+O_{CSI})/N_{RE})$, where $K_1=6$; $n_{HARQ-ACK}$ is a number of actual HARQ-ACK information bits; $O_{SR}$ is a number of SR information bits; $O_{CSI}$ is a number of CSI information bits; $N_{RE}$ is a number of resource elements determined as $N_{RE}=M_{RB,b,f,c}^{PUCCH}(i) \cdot N_{sc,ctrl}^{RB}$. $N_{symb-UCI,b,f,c}^{PUCCH}(i)$, where $N_{sc,ctrl}^{RB}$ is a number of subcarriers per resource block excluding subcarriers used for DM-RS transmission, and $N_{symb-UCI,b,f,c}^{PUCCH}(i)$ is a number of symbols excluding symbols used for DM-RS transmission for PUCCH transmission occasion i.

For a PUCCH transmission using PUCCH format 2 or PUCCH format 3 or PUCCH format 4 and for a number of UCI bits larger than 11, $\Delta_{TF,b,f,c}(i)=10 \log_{10}(2^{K_2 \cdot BPRE}-1))$, where $K_2=2.4$; $BPRE=(O_{ACK}+O_{SR}+O_{CSI}+O_{CRC})/N_{RE}$; $O_{ACK}$ is a number of HARQ-ACK information bits.

One important characteristic of so-called 5G systems is an ability to support multiple service types requiring BLER targets for data or control information that are different by orders of magnitude and requiring widely different latencies for a successful delivery of a transport block.

Enabling reception of transport block with low BLER, such as $10^{-6}$, and low latency is an exceedingly difficult task for a network and can require substantial resources. One approach to achieve a BLER of $10^{-6}$ for a transport block is to rely on retransmissions of a transport block where an initial transmission can target a BLER of $10^{-3}$, a retransmission can also target a BLER of $10^{-3}$ and, assuming independent error event and ignoring a PDCCH BLER for scheduling the initial transmission and a potential retransmission of the transport block and a PUCCH BLER for HARQ-ACK information for the initial transmission, a combined BLER of $10^{-6}$ can be achieved.

For the above approach to be functional, when a gNB schedules a PDSCH reception to a UE by a DCI format in a corresponding PDCCH, the gNB needs to be able to determine whether or not the UE received the PDSCH or, equivalently in practice, whether or not the UE detected the DCI format. For HARQ-ACK transmission by the UE in a PUCCH, the gNB can determine whether or not the UE transmitted the PUCCH by performing energy detection in a corresponding PUCCH resource and, when the gNB does not detect sufficient energy, the gNB can determine that the UE did not detect the DCI format. This is referred to as PDCCH discontinuous transmission (DTX) detection or as PUCCH DTX detection. When the gNB expects HARQ-ACK transmission by the UE in a PUSCH, means need to be provided for the gNB to determine a PDCCH DTX detection and an absence of a corresponding HARQ-ACK information as the UE is not aware of an associated transport block. Otherwise, using the previous example, if the gNB cannot differentiate negative acknowledgement (NACK) from DTX, the gNB is likely to make a conservative assumption for DTX and target a BLER of $10^{-6}$ for the PDSCH retransmission.

A low target BLER for a transport block reception by a UE can be facilitated when multiple transmission points, on the same cell or different cells, transmit the transport block to the UE. In such case, means for the UE to identify that multiple PDSCH receptions include the same transport block and means for the UE to provide corresponding HARQ-ACK information need to be provided.

When a UE is scheduled to simultaneously transmit data information in a PUSCH and UCI in a PUCCH, the UE multiplexes UCI with data information in the PUSCH and drops the PUCCH transmission as it is often challenging to support simultaneous PUSCH and PUCCH transmissions from a UE, especially on the same cell. However, this approach is for data information and UCI associated with the same service type and a low target BLER or latency for the data information is not typically a limiting factor. When a UE supports multiple service types and a PUSCH transmission is for a first service type that has substantially different target BLER or latency requirements than a PUCCH transmission for a second service type, multiplexing UCI in the PUSCH or the UE not transmitting a PUCCH in order to transmit a PUSCH may not be preferable. For example, the data information in the PUSCH can be for a small transport block with resources allocated to achieve a small target BLER and multiplexing a large UCI payload may not be feasible as the data information can require a large number of PUSCH REs for the UCI reception to be reliable.

When a UE is scheduled to simultaneously transmit a UCI type, such as HARQ-ACK or CSI, for a first service type and a UCI type for a second service type, all UCI can be multiplexed in the same PUCCH or the same PUSCH at least when corresponding target BLERs are not substantially different, for example by several orders of magnitude. However, when the target BLERs are substantially different, corresponding REs in the PUCCH or PUSCH need to account for the different target BLERs in order to avoid significantly over-dimensioning or under-dimensioning the number of REs for multiplexing a UCI type.

Collisions between a PUCCH transmission and a PUSCH transmission from a UE may not be possible to avoid and, as it is subsequently discussed in the present disclosure, a result can be loss of some information such as UCI. For example, a PUSCH transmission may be initiated by the UE without advanced knowledge by the gNB in order for the gNB to schedule a PUCCH transmission from the UE that avoids a collision with the PUSCH transmission.

For an operation with carrier aggregation, a UE can have simultaneous transmissions on multiple cells and, particularly when the UE transmits data information or UCI associated with different services, power requirements for corresponding transmissions can be different and require a total power that is larger than a maximum power available for the UE. In case, some transmissions, such as for PUSCH, can be autonomously initiated by the UE, power limitations can be more difficult to predict and avoid by a gNB.

Therefore, there is a need to enable or disable multiplexing of UCI in a PUSCH depending on a target BLER for the data information in the PUSCH or depending on a target BLER or payload of the UCI.

There is another need to support multiplexing in a PUSCH or PUCCH of different UCI of the same type or different types having different target BLERs.

There is yet another need for a gNB to reduce a probability of collision between a PUSCH transmission and a PUCCH transmission from a UE.

There is yet another need to enable a gNB to perform PDCCH DTX detection when the gNB expects transmission of HARQ-ACK information in a PUSCH.

There is yet another need to enable a UE to receive a same transport block from different cells and provide associated HARQ-ACK information.

Finally, there is a need for a UE to determine prioritization for power allocations to various transmissions according to respective BLERs for data information or UCI.

A UCI type, such as HARQ-ACK information or CSI, or data information in a PUSCH transmission can correspond to different services and have different attributes such as target reception reliability (target BLER) and latency. UCI multiplexing in a PUSCH considers the different attributes of the UCI or the PUSCH.

A UE generates HARQ-ACK information in response to reception of a transport block in a PDSCH, or in response to reception of a SPS PDSCH release by a DCI format in a PDCCH. For brevity, the following descriptions refer only to transport block reception. Unless explicitly mentioned otherwise, transmission from and reception by a UE are in one bandwidth part of a cell.

A first embodiment of this disclosure considers UCI multiplexing in a PUSCH that includes data information. UCI transmission typically has higher priority than transmission of data information and, when both data information and UCI cannot be simultaneously transmitted, a UE is expected to transmit UCI and drop transmission of data information. However, when for example data information requires high reception reliability or low latency, it can be less important for a UE to transmit UCI than to transmit data.

A DCI format scheduling a PDSCH reception can include a field indicating a PUCCH resource having an initial symbol and duration in a slot for transmission of HARQ-ACK information corresponding to one or more transport blocks included in the PDSCH. The DCI format can also include a field that indicates a time offset for the PUCCH transmission relative to a last symbol of the PDSCH reception where the time unit of the offset can be configured to be in slots on in symbols of a slot of the PUCCH transmission.

When the time offset is in units of symbols of a slot, a PUCCH resource configuration can include only a PUCCH transmission duration as the initial symbol of the PUCCH transmission is determined by the time offset or, alternatively, a UE can ignore an indication of an initial symbol in a PUCCH resource. When a minimum UE processing time for a PDSCH demodulation, decoding, and generation of corresponding HARQ-ACK information is larger than a time between the end of a last PDSCH reception symbol and the start of a first PUSCH transmission symbol, the UE cannot multiplex UCI in the PUSCH.

For a PUSCH transmission without an associated PDCCH, a gNB cannot generally know that the UE is transmitting PUSCH when the gNB indicates transmission timing for the PUCCH that includes HARQ-ACK information. Also, a UE may generate the HARQ-ACK information after the UE has started mapping data information to PUSCH resources or even after the UE has started transmitting the PUSCH, for example when the HARQ-ACK information corresponds to a small transport block with short decoding time.

A gNB can configure a UE whether or not the UE multiplexes UCI in a PUSCH transmission when the UCI and the data information correspond to the same service type or to different service types and the corresponding configurations can be separate. Applicability for a gNB configuration can depend on a service type through an association with a DCI format. For example, the configuration can be applicable when the UE detects a first DCI format or a DCI format with a first RNTI scheduling a PUSCH transmission for a low latency service and not be applicable when the UE detects a second DCI format or a DCI format with a second RNTI scheduling a PUSCH transmission associated with mobile broadband service.

In the latter case, the UE can be expected to multiplex UCI in the PUSCH transmission and not transmit PUCCH. Alternatively, a gNB configuration to a UE for a simultaneous PUSCH and PUCCH transmissions can also include the DCI format that the configuration is applicable and the UE multiplexes UCI in the PUSCH when a respective DCI format is not one of the applicable DCI formats.

When the UE is not configured to multiplex UCI in a PUSCH transmission, the UE can be additionally configured whether to either transmit only data information in the PUSCH and drop transmission of UCI or transmit only UCI in a PUCCH and drop the PUSCH transmission at least in symbols overlapping with the PUCCH transmission and, when any, in symbols after the PUCCH transmission as a phase continuity for the PUSCH transmission may not be maintained.

A configuration can be separate for each UCI type or common to all UCI types. For example, the gNB can provide separate configurations to a UE for multiplexing HARQ-ACK information in a PUSCH transmission and for multiplexing CSI in a PUSCH transmission as the former multiplexing is dynamic and does not occur when the UE fails to detect an associated DCI format while the latter multiplexing does not have ambiguity based on a higher layer configuration that is acknowledged by the UE. For example, the gNB can provide separate configuration to a UE for whether or not the drops an ongoing PUCCH or PUSCH transmission to transmit a PUCCH conveying SR.

For example, at least when a PUSCH transmission is without an associated PDCCH, a UE can be configured to drop the UCI transmission or the reverse (drop the PUSCH). For example, when a PUSCH transmission is with repetitions, a UE can drop the UCI transmission as a gNB may not be able to determine that the UE dropped a PUSCH repetition, instead of the UCI transmission, thereby receiving noise instead of the PUSCH repetition and adversely affecting PUSCH BLER. When the UCI corresponds to HARQ-ACK information, the gNB can either retransmit a corresponding PDSCH or, in case the PDSCH transmission is highly reliable, assume that the UE correctly decoded associated data information in the PDSCH. When the UCI corresponds to CSI, the gNB can use an earlier CSI report. When the UCI corresponds to SR, the UE can either autonomously transmit data or can include a buffer status report in the PUSCH.

A configuration for UCI multiplexing in a PUSCH can also be separate for the same UCI type that is associated with different services that are identified by a RNTI included in a DCI format, or by different DCI formats, or by configuration. For example, the gNB can configure the UE not to multiplex in a PUSCH transmission that is scheduled by a DCI format that includes a first RNTI or is configured by higher layers, HARQ-ACK information corresponding to a transport block in a PDSCH reception that is scheduled by a DCI format that includes a second RNTI. For example, the gNB can configure the UE not to multiplex in a PUSCH transmission that is scheduled by a first DCI format or is configured by higher layers, HARQ-ACK information corresponding to a transport block in a PDSCH reception that is scheduled by a second DCI format. For example, a configuration for CSI transmission from the UE in a PUCCH can include a configuration for whether or not the UE multiplexes CSI in a PUSCH transmission that is scheduled by a first DCI format or by a DCI format that includes a first RNTI, or is configured by a specific higher layer configuration.

Figure 11:
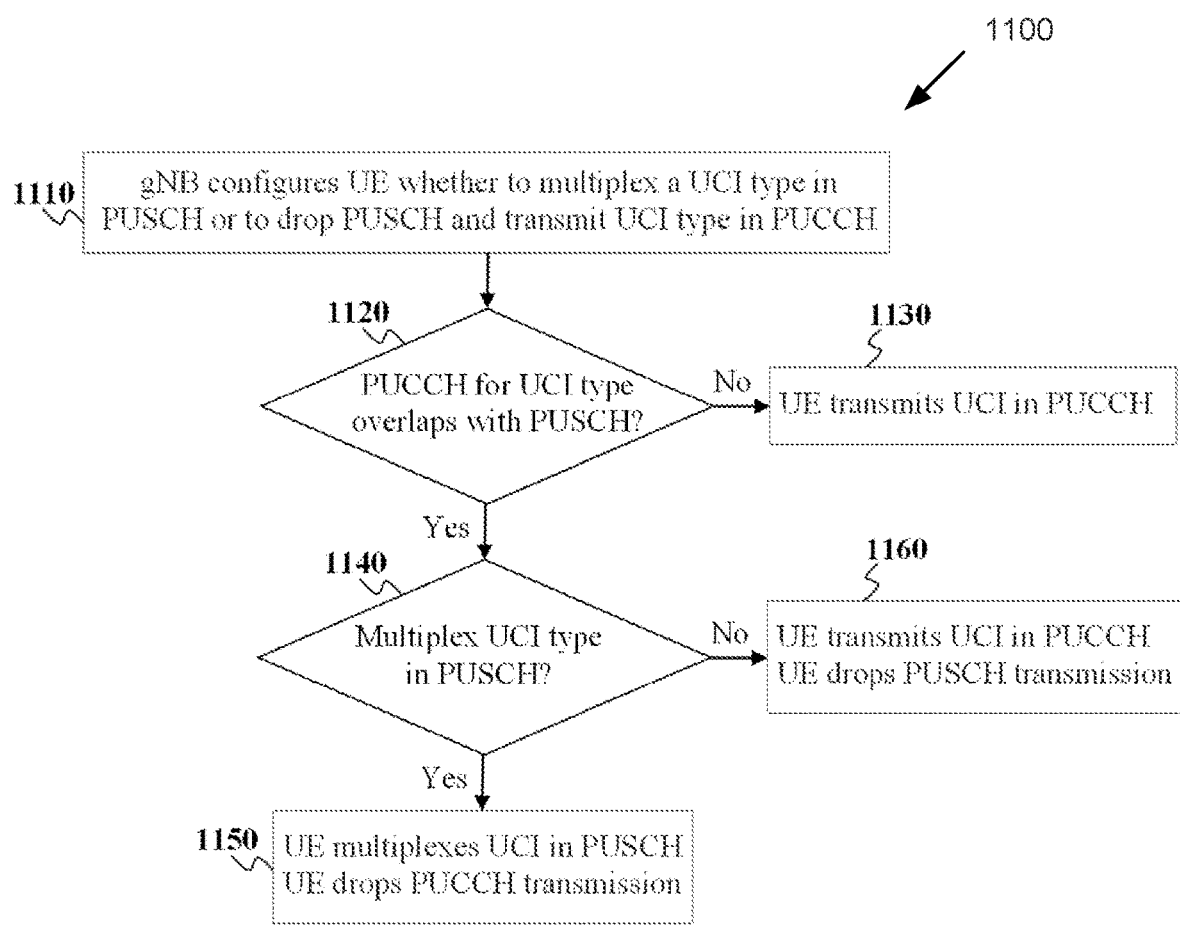
FIG. 11 illustrates an example process for a UE to transmit UCI in a PUSCH or PUCCH according to embodiments of the present disclosure.

FIG. 11 illustrates an example process 1100 for a UE to transmit UCI in a PUSCH or PUCCH according to embodiments of the present disclosure. An embodiment of the process 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

A gNB configures a UE whether to multiplex a UCI type in PUSCH transmission or to drop the PUSCH transmission and transmit the UCI type in a PUCCH 1110. The UE determines whether a PUCCH transmission overlaps with a PUSCH transmission 1120. When the PUCCH transmission does not overlap with the PUSCH transmission, the UE transmits the UCI type in the PUCCH 1130. When the PUCCH transmission overlaps with the PUSCH transmission, the UE determines whether or not the configuration is for multiplexing UCI in the PUSCH transmission 1140. When the configuration is for multiplexing UCI in the PUSCH transmission, the UE multiplexes the UCI in the PUSCH transmission and does not transmit the PUCCH 1150. When the configuration is not for multiplexing UCI in the PUSCH transmission, the UE multiplexes the UCI in the PUCCH transmission and does not transmit the PUSCH 1160.

When a UE is configured to multiplex UCI in a PUSCH transmission and the associated timing requirements are met, a determination by a UE whether to either drop the PUSCH and transmit UCI in a PUCCH or multiplex UCI in the PUSCH can be further conditioned on whether or not, respectively, a number of PUSCH REs required to multiplex the UCI in the PUSCH exceeds the threshold value a provided to the UE in advance by higher layers in Equation 1.

When the threshold value is exceeded, the UE can either drop the PUSCH transmission and transmit HARQ-ACK information in the PUCCH or apply spatial, time, or cell domain bundling for the HARQ-ACK information, or drop some HARQ-ACK information bits until the number of PUSCH REs required to multiplex HARQ-ACK information in the PUSCH is not exceeded.

When a UE is configured to transmit simultaneously a PUSCH and PUCCH conveying HARQ-ACK information, the UE does not need to reserve REs in a PUSCH transmission for potential HARQ-ACK transmission. Alternatively, in order to enhance a detection reliability of HARQ-ACK information at a gNB, reserved resource elements (REs) in a PUSCH transmission can be maintained even when the UE transmits HARQ-ACK information in a PUCCH and the UE can transmit same HARQ-ACK information (of 1 or 2 bits) in the PUCCH and in the PUSCH.

A gNB can also configure, or can be predetermined in a system operation, a number of reserved REs in a PUSCH to correspond to a different number of HARQ-ACK bits. For example, for a PUSCH transmission associated with a first DCI format or with a first RNTI in a DCI format, the number of reserved REs can correspond to 2 HARQ-ACK information bits while for a PUSCH transmission associated with a second DCI format or with a second RNTI in a DCI format, the number of reserved REs can correspond to 1 HARQ-ACK information bit.

When a UE transmits a PUSCH autonomously, based on previously configured parameters and without an associated detection of a DCI format, the UE may not be able to multiplex HARQ-ACK (or CSI) information in the PUSCH even when the UE is expected to do so. For example, as a gNB may not be aware of an ongoing grant-free, also referred to as configured-grant, PUSCH transmission from the UE at a time the gNB indicates to the UE to transmit a PUCCH with HARQ-ACK information, and as the PUCCH transmission can start at any symbol of a slot, the UE may typically be unable to multiplex the HARQ-ACK information in the PUSCH. The UE can then drop the transmission of HARQ-ACK information or the UE can be configured by the gNB to drop the ongoing PUSCH transmission and transmit the HARQ-ACK information in the PUCCH.

A gNB can configure a UE to monitor multiple DCI formats or multiple RNTIs for a DCI format scheduling PDSCH receptions to the UE. HARQ-ACK information corresponding to a transport block included in a PDSCH scheduled by a first DCI format or by a DCI format that includes a first RNTI or by a first higher layer configuration is referred to as Type 1 HARQ-ACK information and HARQ-ACK information corresponding to a transport block included in a PDSCH scheduled by a second DCI format or by a DCI format that includes a second RNTI or by a second higher layer configuration is referred to as Type 2 HARQ-ACK information.

When a UE is indicated PUCCH resources that overlap in time for respective transmission of Type 1 HARQ-ACK information and Type 2 HARQ-ACK information and a processing timeline for multiplexing the two types of HARQ-ACK information is fulfilled, the UE can be configured to either multiplex the two types of HARQ-ACK information in a single PUCCH or transmit one HARQ-ACK information type in a PUCCH. In the latter case, the HARQ-ACK information type can also be configured or can be default in the system operation to correspond to a predetermined DCI format, RNTI, or higher layer configuration.

When a UE is configured to multiplex Type 1 HARQ-ACK information and Type 2 HARQ-ACK information in the same PUCCH, the UE can also be configured whether to jointly encode or separately encode the HARQ-ACK information for the two types. For example, joint encoding can apply when a target BLER for Type 1 HARQ-ACK information is similar to a target BLER for Type 2 HARQ-ACK information; otherwise, separate coding can apply.

A gNB configures a UE a first maximum code rate for multiplexing Type 1 HARQ-ACK information in a PUCCH. The gNB also configures the UE a second maximum code rate for multiplexing Type 2 HARQ-ACK information in a PUCCH. When the gNB configures the UE to multiplex Type 1 HARQ-ACK information and Type 2 HARQ-ACK information in a PUCCH using separate coding, the gNB also configures the UE a code rate offset that the UE adds to the second maximum code rate to obtain a third maximum code rate for multiplexing Type 2 HARQ-ACK information in a PUCCH when the UE also multiplexes Type 1 HARQ-ACK information in the PUCCH (in a functional equivalent, the gNB directly configures to the UE the third code rate). When a coding scheme is repetition coding, such as for example when a number of Type 1 or Type 2 HARQ-ACK information bits is one, the UE can be configured a number of repetitions or equivalently a number of REs for mapping the HARQ-ACK information bit.

The UE determines a first minimum number of PUCCH REs that can be used for transmission of Type 1 HARQ-ACK information with a code rate smaller than or equal to the first (maximum) code rate and a second minimum number of PUCCH REs that can be used for transmission of Type 2 HARQ-ACK information with a code rate smaller than or equal to the third (maximum) code rate. The UE then determines a PUCCH resource that includes a minimum number of REs for HARQ-ACK transmission that is larger than or equal to the sum of the first minimum number of REs and the second minimum number of REs.

The UE can determine a PUCCH transmission power as in Equation 3 based on transmission of only one HARQ-ACK information type, such as Type 1 HARQ-ACK information. The UE can be provided separate values of $P_{O,PUCCH,b,f,c}(q_u)$ for transmission of Type 1 HARQ-ACK information bits and for transmission of Type 2 HARQ-ACK information bits. The UE can have same or separate closed loop power control loops $g_{b,f,c}(i,l)$ for transmission of Type 1 HARQ-ACK information bits and for transmission of Type 2 HARQ-ACK information bits.

As a resulting PUCCH transmission power for the other HARQ-ACK information type, such as Type 2 HARQ-ACK information, can be larger than required to achieve a corresponding target BLER, when Type 1 HARQ-ACK information requires smaller target BLER than Type 2 HARQ-ACK information, the UE can use the third maximum code rate for Type 2 HARQ-ACK information instead of the second maximum code rate that is applicable when the UE does not multiplex Type 1 HARQ-ACK information in the PUCCH and uses a smaller PUCCH transmission power.

Figure 12:
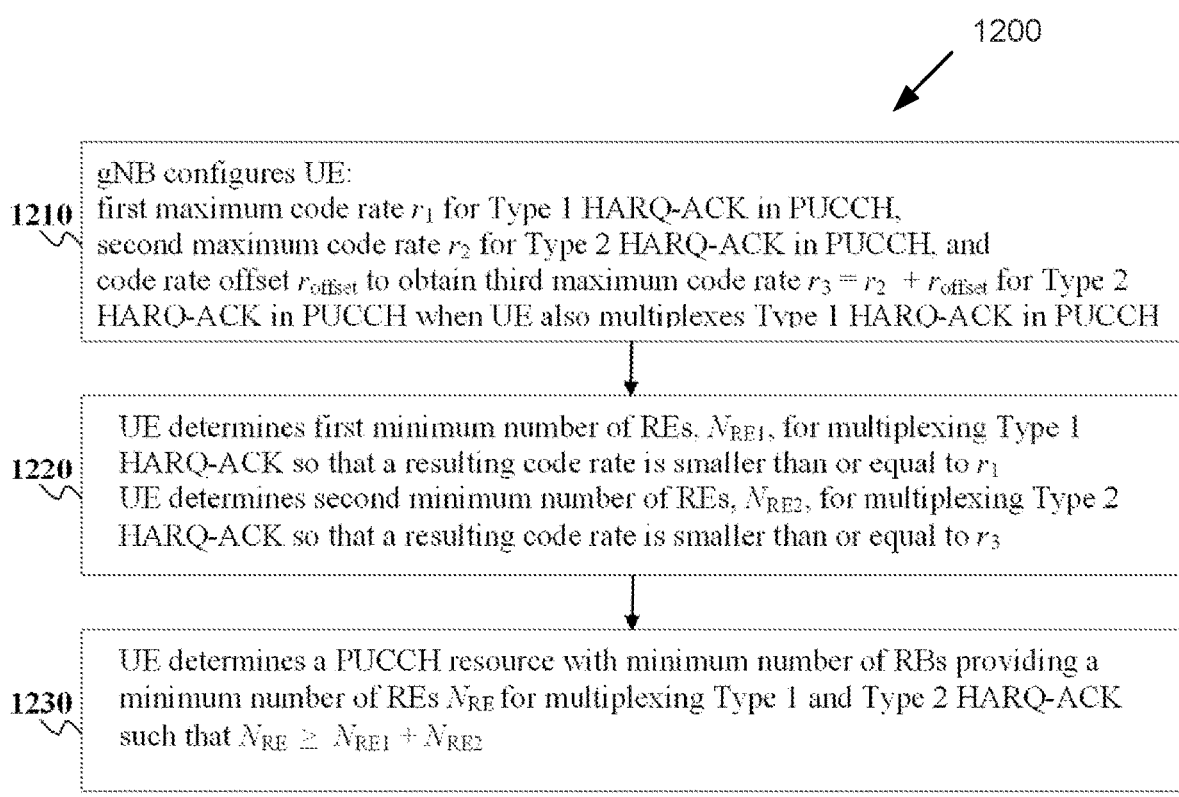
FIG. 12 illustrates an example process for a UE to multiplex Type 1 HARQ-ACK information and Type 2 HARQ-ACK information in a PUCCH according to embodiments of the present disclosure.

FIG. 12 illustrates an example process 1200 for a UE to multiplex Type 1 HARQ-ACK information and Type 2 HARQ-ACK information in a PUCCH according to embodiments of the present disclosure. An embodiment of the process 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

A gNB configures a UE with a first maximum code rate $r_1$ for transmission of Type 1 HARQ-ACK information bits in a PUCCH and with a second maximum code rate $r_2$ for transmission of Type 2 HARQ-ACK information bits in a PUCCH and with a code rate offset $r_{offset}$ that the UE adds to the second maximum code rate $r_2$ for the UE to obtain a third maximum code rate $r_3=r_2+r_{offset}$ (or, functionally equivalently, with a third code rate $r_3$) for transmission of Type 2 HARQ-ACK information bits in a PUCCH when the UE also multiplexes Type 1 HARQ-ACK information bits in the PUCCH 1210.

When the UE has both Type 1 HARQ-ACK information bits and Type 2 HARQ-ACK information bits to multiplex in a PUCCH, the UE determines first and second minimum number of REs, $N_{RE1}$ and $N_{RE2}$, for multiplexing Type 1 and Type 2 HARQ-ACK information bits, respectively, so that resulting code rates for 1 and Type 2 HARQ-ACK information bits are smaller than the first $r_1$ and third $r_3$ maximum code rates, respectively 1220. The UE determines a PUCCH resource with a minimum number of RBs providing a corresponding minimum number of REs $N_{RE}$ for multiplexing Type 1 and Type 2 HARQ-ACK information bits (excluding REs used for DMRS transmission in the PUCCH), that is larger than or equal to the sum of the first number of REs $N_{RE1}$ and the second number of REs $N_{RE2}$, $N_{RE} \geq N_{RE1} + N_{RE2}$, and transmits the PUCCH in the resource 1230.

In addition to a first symbol and a duration, a PUCCH resource can include a first RB and the UE can be configured a maximum number of RBs for a PUCCH transmission. When a maximum number of REs available for HARQ-ACK transmission in a PUCCH resource with the maximum number of RBs is smaller than the first minimum number of REs and the second minimum number of REs, the UE can either drop Type 2 HARQ-ACK information from transmission in a PUCCH or apply bundling for the Type 2 HARQ-ACK information in a spatial domain, time domain, or cell domain. The UE behavior can be specified in the system operation or configured to the UE by higher layers. Alternatively, or when a maximum number of REs available for transmission of HARQ-ACK information in a PUCCH remains smaller than the first minimum number of REs and the second minimum number of REs after the UE applies bundling for Type 2 HARQ-ACK information, the UE can drop a number of Type 2 HARQ-ACK information bits, such as first ones or last ones in a corresponding codeword, so that a resulting code rate is smaller than the second maximum code rate.

Figure 13:
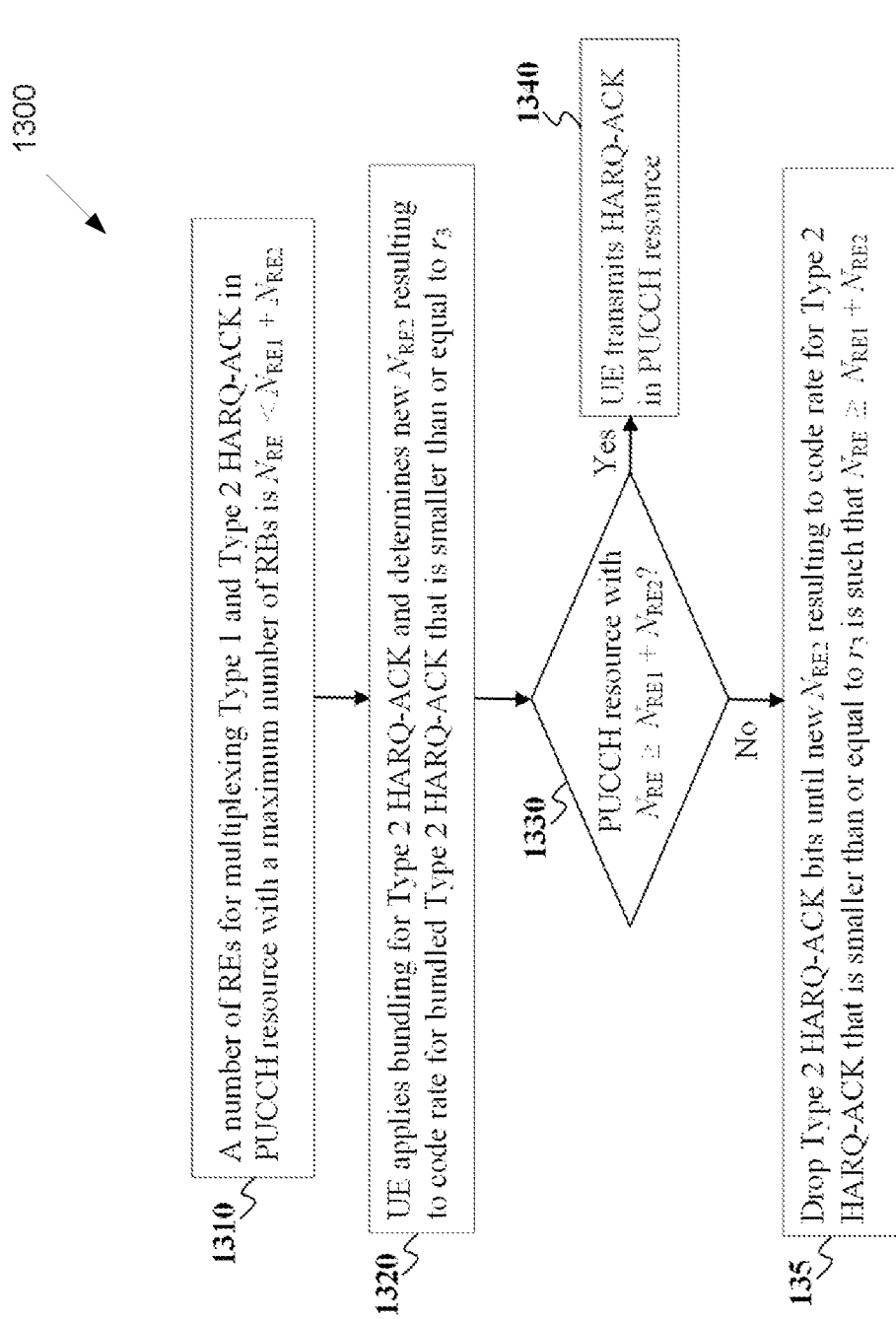
FIG. 13 illustrates an example process for a UE to multiplex Type 1 HARQ-ACK information and Type 2 HARQ-ACK information when a number of REs in a PUCCH resource with a maximum number of REs is smaller than a required number of REs according to embodiments of the present disclosure.

FIG. 13 illustrates an example process 1300 for a UE to multiplex Type 1 HARQ-ACK information and Type 2 HARQ-ACK information when a number of REs in a PUCCH resource with a maximum number of REs is smaller than a required number of REs according to embodiments of the present disclosure. An embodiment of the process 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

A UE determines that for a number of REs $N_{RE1}$ for multiplexing Type 1 HARQ-ACK information bits with a code rate smaller than or equal to $r_1$ and for a number of REs $N_{RE2}$ for multiplexing Type 2 HARQ-ACK information bits with a code rate smaller than or equal to $r_2$ in a PUCCH resource with a maximum number of RBs that includes $N_{RE}$ REs for multiplexing HARQ-ACK information bits, it is $N_{RE} < N_{RE1} + N_{RE2}$ 1310.

The UE applies spatial domain or time domain or cell domain bundling (for example, spatial domain bundling can apply first, followed by time domain bundling, if applicable, and the followed by cell domain bundling, if applicable) for Type 2 HARQ-ACK information bits and determines a new number Nm of REs resulting to code rate for bundled Type 2 HARQ-ACK information bits that is smaller than or equal to $r_3$ 1320. Alternatively, the UE can drop all Type 2 HARQ-ACK information bits instead of applying bundling. The UE determines whether there is a PUCCH resource with a number of REs available for multiplexing HARQ-ACK information bits such that $N_{RE} \geq N_{RE1} + N_{RE2}$ 1330.

When there is the PUCCH resource with a number of REs available for multiplexing HARQ-ACK information bits such that $N_{RE} \geq N_{RE1} + N_{RE2}$ 1330, the UE transmits the Type 1 HARQ-ACK information bits and the bundled Type 2 HARQ-ACK information bits in a PUCCH using the resource 1340.

When there is not the PUCCH resource with a number of REs available for multiplexing HARQ-ACK information bits such that $N_{RE} \geq N_{RE1} + N_{RE2}$ 1330, the UE transmits the Type 1 HARQ-ACK information bits and drops a number of Type 2 HARQ-ACK information bits, including all Type 2 HARQ-ACK information bits, so that for a PUCCH resource (can be the PUCCH resource with the maximum number of RBs) it is $N_{RE} \geq N_{RE1} + N_{RE2}$ and the UE transmits the Type 1 HARQ-ACK information bits and the remaining bundled Type 2 HARQ-ACK information bits in a PUCCH using the resource 1350.

The aforementioned descriptions can be extended in a similar manner to apply for other UCI types such as SR or CSI and corresponding descriptions are omitted for brevity.

When Type 1 HARQ-ACK information and Type 2 HARQ-ACK information are jointly coded, instead of a first (maximum) code rate and a second (maximum) code rate, the UE can be configured a single (maximum) code rate. When a maximum number of REs available for UCI transmission in a PUCCH is smaller than a number of REs required for the jointly coded Type 1 and Type 2 HARQ-ACK information bits to have a code rate that is smaller than the configured (maximum) code rate, bundling or dropping of Type 2 HARQ-ACK information bits can progressively apply (or Type 2 HARQ-ACK may be completely dropped) as previously described until a number of REs required for the jointly coded Type 1 and Type 2 HARQ-ACK information bits is smaller than the maximum number of REs available for UCI transmission in a PUCCH.

When a gNB configures a UE to multiplex Type 1 HARQ-ACK information in a PUSCH associated with the same service as Type 2 HARQ-ACK information, the UE can reserve a number of REs in the PUSCH to multiplex up to a certain number of Type 1 HARQ-ACK information bits, such as up to one or two Type 1 HARQ-ACK information bits. A number of reserved REs for multiplexing Type 2 HARQ-ACK information bits can correspond to a number of Type 2 HARQ-ACK information bits that is same or different than a number of Type 2 HARQ-ACK information bits when the UE is not configured to multiplex Type 1 HARQ-ACK information in a PUSCH. The reserved REs for multiplexing Type 1 HARQ-ACK information are not used for multiplexing any other information type.

When the UE does not have Type 1 HARQ-ACK information to transmit, the UE can indicate NACK value or PDCCH DTX in the reserved REs. Reserved REs for multiplexing Type 1 HARQ-ACK information are separate from reserved REs for multiplexing Type 2 HARQ-ACK information.

When a gNB configures a UE to multiplex Type 1 HARQ-ACK information in a PUSCH associated with the same service as Type 1 HARQ-ACK information, the UE can reserve a number of REs in the PUSCH to multiplex up to a certain number of Type 1 HARQ-ACK information bits, such as up to one or two Type 1 HARQ-ACK information bits, and the UE may not reserve any REs to multiplex Type 2 HARQ-ACK information.

Similar, for multiplexing UCI in a PUSCH, a gNB can separately provide a UE by higher layers a $\beta_{offset}^{HARQ-ACK}$ value or a set of $\beta_{offset}^{HARQ-ACK}$ values for the UE to use depending for example on the DCI format, or on the RNTI associated with the DCI format, that schedules the PUSCH transmission. For multiplexing Type 1 and Type 2 HARQ-ACK information in a PUSCH, corresponding parameters are denoted as $\beta_{offset}^{HARQ-ACK,1}$ and $\beta_{offset}^{HARQ-ACK,2}$.

For multiplexing Type 1 HARQ-ACK information and Type 1 HARQ-ACK information in a PUSCH that includes a transport block for the same service type (DCI format associations) as Type 2 HARQ-ACK information, a number of coded modulation symbols per layer for Type 2 HARQ-ACK information, denoted as $Q'_{ACK,2}$, is determined as in Equation 1 by replacing $\beta_{offset}^{HARQ-ACK}$ by $\beta_{offset}^{HARQ-ACK,2}$ and $O_{ACK}$ by $O_{ACK,2}$ that is a number of Type 2 HARQ-ACK information bits. For additionally multiplexing Type 1 HARQ-ACK information bits, a number of coded modulation symbols per layer for Type 1 HARQ-ACK information bits, denoted as $Q'_{ACK,1}$, is determined as in Equation 4 given by:

$$Q'_{ACK,1} = \min\left\{\left\lceil \frac{(O_{ACK,2} + L_{ACK,2}) \cdot \beta_{offset}^{HARQ-ACK,1} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK,2}\right\}$$

(Equation 4)

In Equation 4: $Q'_{ACK,2}$ is the number of coded modulation symbols per layer for Type 2 HARQ-ACK information bits when the number of Type 2 HARQ-ACK information bits is more than 2, $$Q'_{ACK,2} = \sum_{l=0}^{N_{symb,all}^{PUSCH}-1} \overline{M}_{sc,rvd}^{ACK,2}(l)$$

when the number of HARQ-ACK information bits is no more than 2 bits, where $\overline{M}_{sc,rvd}^{ACK,2}(l)$ is the number of reserved resource elements for potential Type 2 HARQ-ACK information bits in OFDM symbol l, for l= 0, 1, 2, ..., $N_{symb,all}^{PUSCH}-1$, in the PUSCH transmission. The value of $\alpha$ can be separately provided by higher layers for Type 1 HARQ-ACK information bits $\alpha_1$ and for Type 2 HARQ-ACK information bits $\alpha_2$. It is also possible that $\alpha_1=1$ by default.

The mapping order for coded modulation symbols for Type 1 and Type 2 HARQ-ACK information bits can also be reversed and $Q'_{ACK,1}$ can be determined as in Equation 1 while $Q'_{ACK,2}$ can be determined as in Equation 4 (with corresponding switching of respective terms such as, for example, switching $Q'_{ACK,1}$ and $Q'_{ACK,2}$ in Equation 4). In case the PUSCH includes reserved REs also for Type 1 HARQ-ACK information bits, coded modulation symbols for Type 2 HARQ-ACK information cannot be mapped to the reserved REs similar to not mapping coded modulation symbols for Type 1 HARQ-ACK information to the reserved REs for Type 2 HARQ-ACK information bits in Equation 4.

For determining a number of coded modulation symbols per layer for CSI, both $Q'_{ACK,1}$ and $Q'_{ACK,2}$ need to be subtracted in Equation 2. In case the PUSCH includes reserved REs also for Type 1 HARQ-ACK information bits, CSI cannot be mapped to the reserved REs similar to the reserved REs for Type 2 HARQ-ACK information bits. As for the HARQ-ACK information, separate $\beta_{offset}^{CSI,1}$ and $\beta_{offset}^{CSI,2}$ values (or set of values) can be provided for CSI multiplexing in a PUSCH depending on the DCI format used to schedule the PUSCH transmission.

Figure 14:
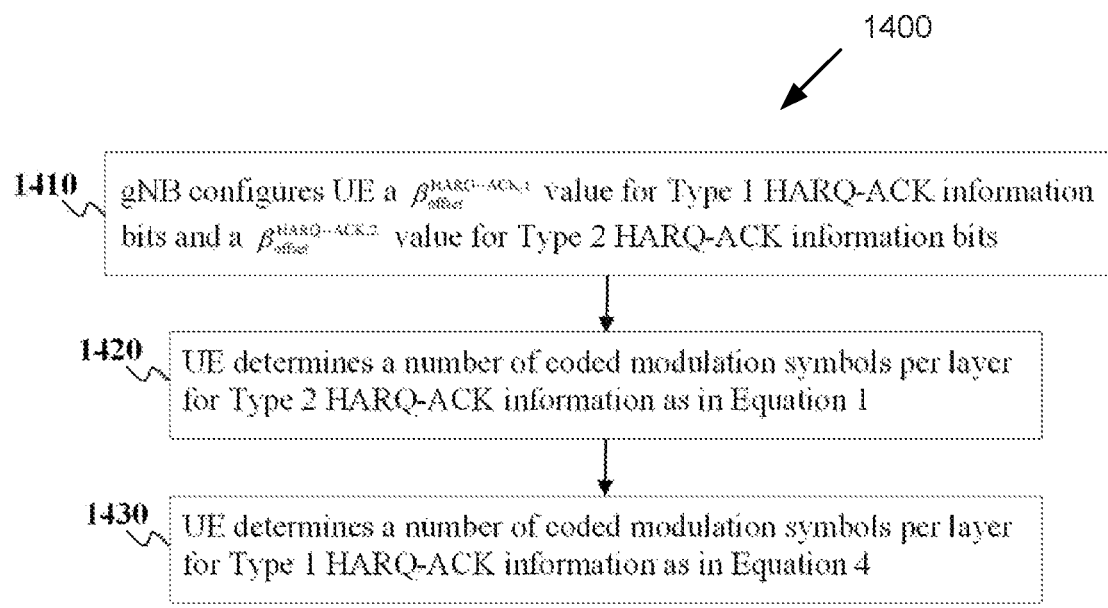
FIG. 14 illustrates an example process for a UE to determine a transmission power according to embodiments of the present disclosure.

FIG. 14 illustrates an example process 1400 for a UE to determine a transmission power according to embodiments of the present disclosure. An embodiment of the process 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

A gNB configures a UE a $\beta_{offset}^{HARQ-ACK,1}$ value (or a set of $\beta_{offset}^{HARQ-ACK,1}$ values when an index in the set is provided by a value of a field in the DCI format scheduling the PUSCH) for Type 1 HARQ-ACK information bits and a $\beta_{offset}^{HARQ-ACK,2}$ value (or a set of $\beta_{offset}^{HARQ-ACK,1}$ values when an index in the set is provided by the value of the field in the DCI format scheduling the PUSCH) for Type 2 HARQ-ACK information bits 1410. The UE determines a number of coded modulation symbols per layer for Type 2 HARQ-ACK information as in Equation 1 (or as in Equation 4) 1420. The UE determines a number of coded modulation symbols per layer for Type 1 HARQ-ACK information as in Equation 4 (or as in Equation 1, respectively, by mapping Type 1 HARQ-ACK information first) 1430. The UE does not map coded modulation symbols for Type 1 HARQ-ACK information bits to reserved REs for Type 2 HARQ-ACK information bits and the reverse.

Figure 15:
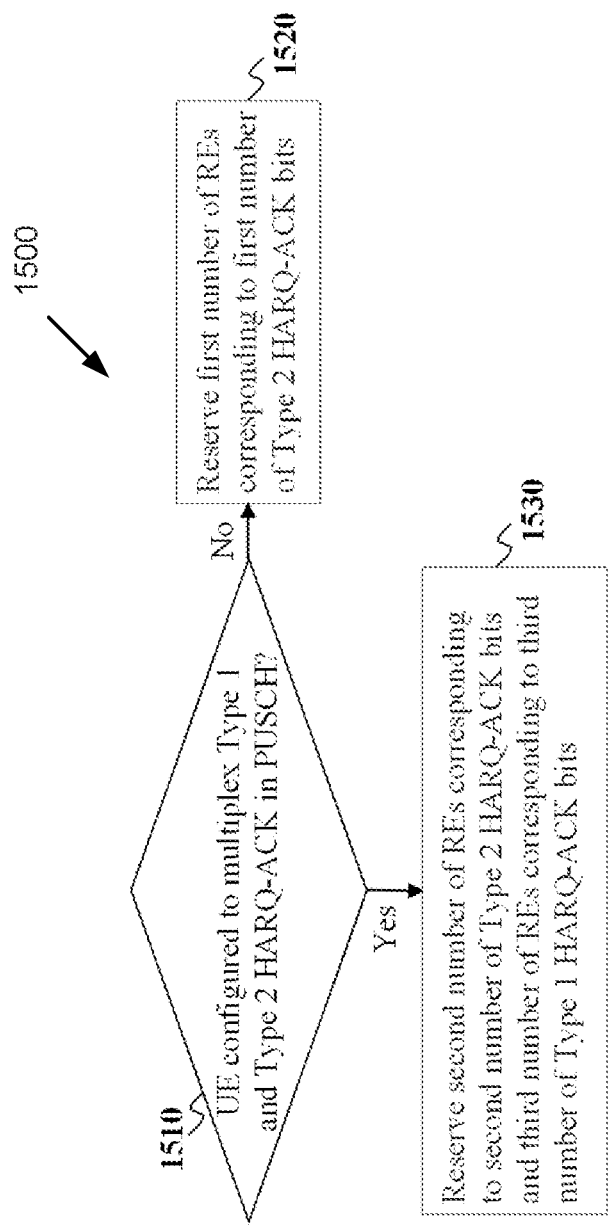
FIG. 15 illustrates an example process for a UE to reserve REs for Type 1 HARQ-ACK information bits and for Type 2 HARQ-ACK information bits in a PUSCH according to embodiments of the present disclosure.

FIG. 15 illustrates an example process 1500 for a UE to reserve REs for Type 1 HARQ-ACK information bits and for Type 2 HARQ-ACK information bits in a PUSCH according to embodiments of the present disclosure. An embodiment of the process 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

A UE determines whether or not the UE is provided by higher layers a parameter enabling multiplexing for Type 1 and Type 2 HARQ-ACK information bits in a PUSCH associated with the same service as Type 2 HARQ-ACK information bits 1510 (as identified by corresponding DCI formats or as configured by higher layers). When the higher layer parameter does not enable this multiplexing, the UE reserves a first number of REs corresponding to a first number of Type 2 HARQ-ACK information bits where other information types are not mapped in the reserved REs 1520.

When the higher layer parameter enables this multiplexing, the UE reserves a second number of REs corresponding to a second number of Type 2 HARQ-ACK information bits and reserves a third number of REs corresponding to a third number of Type 1 HARQ-ACK information bits where other information types are not mapped in the reserved REs 1530.

For either HARQ-ACK information type, the UE can use reserved REs to multiplex HARQ-ACK information corresponding to transport blocks scheduled by DCI formats the UE detects after the UE detects a DCI format scheduling a respective PUSCH transmission provided that a processing time required for the UE to multiplex the HARQ-ACK information in the reserved REs is satisfied. If the number of HARQ-ACK information bits to be multiplexed in reserved REs is larger than a reference number of HARQ-ACK information bits used to determine the reserved REs, the UE can apply bundling of HARQ-ACK information bits or drop predetermined HARQ-ACK information bits, such as first or last HARQ-ACK information bits, until a resulting number of HARQ-ACK information bits is equal to the reference number of HARQ-ACK information bits.

Alternatively, when the UE detects one or more DCI formats scheduling corresponding PDSCH receptions and indicating a PUCCH transmission timing for a corresponding HARQ-ACK information that overlaps with a PUSCH transmission from the UE that is scheduled by a DCI format the UE detects prior to detecting the one or more DCI formats, the UE can be configured to drop the PUSCH transmission and transmit all HARQ-ACK information in the PUCCH.

The determination for a number of coded modulation symbols for HARQ-ACK information or CSI in a PUSCH transmission, as in Equations 1, 2 or 4, assumes that a transmission of a transport block for data information is over only the PUSCH transmission used for HARQ-ACK multiplexing. However, when a transmission transport block is repeated over a number of $N_{PUSCH}$ PUSCH transmissions, a spectral efficiency of the transport block transmission is smaller by a factor of $N_{PUSCH}$. The formulas in Equations 1, 2, and 4, can then be modified as in Equation 5 (corresponding to Equation 1, the adjustment to Equations 2 and 4 are same) given by:

$$Q'_{ACK} = \min\left\{\left\lceil\frac{(O_{ACK} + L_{ACK}) \cdot \beta_{offset}^{PUSCH} \cdot N_{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left\lceil\alpha \cdot \sum_{l=l_0}^{N_{symb,all}^{PUSCH}-1} M_{sc}^{UCI}(l)\right\rceil\right\}$$

(Equation 5)

A range of values for the $\beta_{offset}^{PUSCH}$ parameters is based on an assumption that a target BLER for transport block detection is larger than a target BLER for UCI type detection. For example, a target BLER for a transport block can be 10% while a target BLER for HARQ-ACK information can be 1%. This motivates $\beta_{offset}^{PUSCH}$ larger than one. However, it is possible that for services associated with high reliability that a target BLER for a transport block is smaller than a target BLER for HARQ-ACK information.

For example, a target BLER for a transport block can be 0.001% while a target BLER for HARQ-ACK information can be 0.1%. Then, $\beta_{offset}^{PUSCH}$ values smaller than 1 need to be used as a spectral efficiency for HARQ-ACK information can be smaller than a spectral efficiency for data information. When a UE can be scheduled PUSCH transmission for different services, the UE can be configured to use a first $\beta_{offset}^{PUSCH}$ value, or a first set of $\beta_{offset}^{PUSCH}$ values, for determining a number of coded modulation symbols for a corresponding UCI type when the PUSCH transmission is scheduled by a first DCI format or a DCI format with a first RNTI and be configured to use a second $\beta_{offset}^{PUSCH}$ value, or a second set of $\beta_{offset}^{PUSCH}$ values, for determining a number of coded modulation symbols for a corresponding UCI type when the PUSCH transmission is scheduled by a second DCI format or a DCI format with a second RNTI.

When UCI types associated with different services, for example as determined by corresponding DCI formats, are multiplexed in the same PUSCH, $\beta_{offset}^{PUSCH}$ values for determining a corresponding number of coded modulation symbols can depend on the DCI format scheduling the PUSCH transmission.

For example, when a first DCI format schedules the PUSCH transmission, a serving gNB can target a first BLER such as 10%, a first $\beta_{offset}^{HARQ-ACK}$ value can be configured, or indicated by the DCI format from a first set of configured values, for determining a number of coded modulation symbols for a first HARQ-ACK information type and a second $\beta_{offset}^{HARQ-ACK}$ value can be configured, or indicated by the DCI format from a second set of configured values, for determining a number of coded modulation symbols for a second HARQ-ACK information type.

When a second DCI format schedules the PUSCH transmission, a serving gNB can target a second BLER such as 0.001%, a third $\beta_{offset}^{HARQ-ACK}$ value can be configured, or indicated by the DCI format from a third set of configured values, for determining a number of coded modulation symbols for the first HARQ-ACK information type, and a fourth $\beta_{offset}^{HARQ-ACK}$ value can be configured, or indicated by the DCI format from a fourth set of configured values, for determining a number of coded modulation symbols for the second HARQ-ACK information type.

Figure 16:
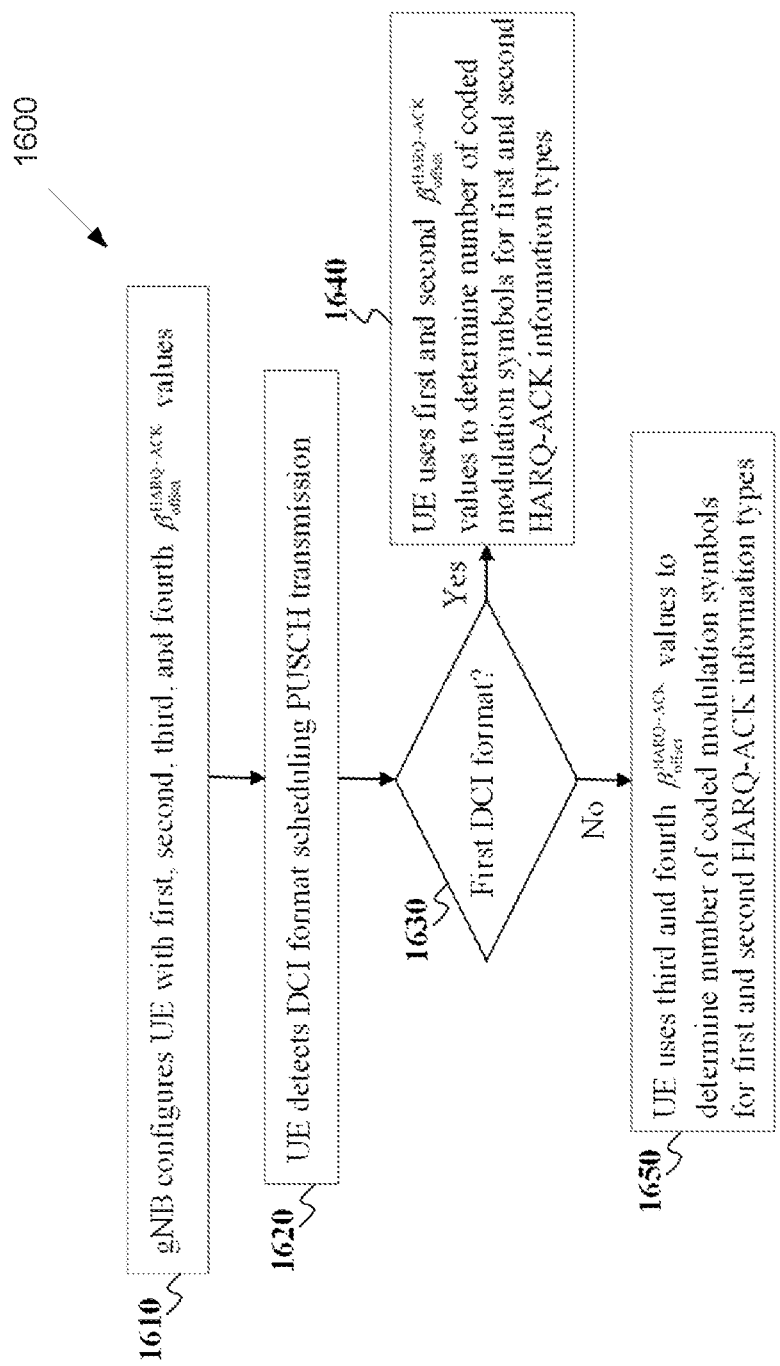
FIG. 16 illustrates an example process for a UE to determine a $\beta_{offset}^{HARQ-ACK}$ value according to embodiments of the present disclosure.

FIG. 16 illustrates an example process 1600 for a UE to determine a $\beta_{offset}^{HARQ-ACK}$ value according to embodiments of the present disclosure. An embodiment of the process 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

A gNB configures a UE with a first $\beta_{offset}^{HARQ-ACK}$ value, or a first set of $\beta_{offset}^{HARQ-ACK}$ values, for determining a number of coded modulation symbols for a first HARQ-ACK information type in a PUSCH scheduled by a first DCI format, a second $\beta_{offset}^{HARQ-ACK}$ value, or a second set of $\beta_{offset}^{HARQ-ACK}$ values, for determining a number of coded modulation symbols for a second HARQ-ACK information type in a PUSCH scheduled by the first DCI format, a third $\beta_{offset}^{HARQ-ACK}$ value, or a third set of $\beta_{offset}^{HARQ-ACK}$ values, for determining a number of coded modulation symbols for the first HARQ-ACK information type in a PUSCH scheduled by a second DCI format, and a fourth $\beta_{offset}^{HARQ-ACK}$ value, or a fourth set of $\beta_{offset}^{HARQ-ACK}$ values, for determining a number of coded modulation symbols for the second HARQ-ACK information type in a PUSCH scheduled by the second DCI format 1610.

The UE detects a DCI format scheduling a PUSCH transmission 1620. When the DCI format is the first DCI format 1630, the UE uses the first or second $\beta_{offset}^{HARQ-ACK}$ values to determine a number of coded modulation symbols for the first HARQ-ACK information type or the second HARQ-ACK information type in the PUSCH, respectively 1640. When the DCI format is the second DCI format 1630, the UE uses the third or fourth $\beta_{offset}^{HARQ-ACK}$ values to determine a number of coded modulation symbols for the first HARQ-ACK information type or the second HARQ-ACK information type in the PUSCH, respectively 1650.

Multiplexing multiple UCI of the same type in a PUSCH can depend on a DCI format used to schedule the PUSCH transmission. For example, when a first DCI format or a DCI format with a first RNTI schedules a PUSCH transmission, multiplexing first and second HARQ-ACK information types in the PUSCH can be enabled as a corresponding transport block BLER can be relatively large while when a second DCI format or a DCI format with a second RNTI schedules a PUSCH transmission, multiplexing only the second HARQ-ACK information type in the PUSCH can be enabled/allowed as a corresponding transport block BLER can be relatively small and it is then detrimental to use REs for multiplexing HARQ-ACK information of the first type. Whether UCI multiplexing in a PUSCH is enabled or not can also be indicated by a field in the DCI format scheduling the PUSCH transmission.

Reduction in PUCCH and PUSCH collision probability.

To reduce a probability that a PUCCH transmission overlaps with a PUSCH transmission, a DCI format can indicate a set of PUCCH resources, instead of a single PUCCH resource. The UE can then select for a PUCCH transmission a PUCCH resource from the set of PUCCH resources that does not overlap in time with the PUSCH transmission. When all resources from the set of PUCCH resources overlap with PUSCH transmission, the UE behavior can be as described in the first embodiment of this disclosure.

For example, for a slot that includes 14 symbols, a UE can be configured repetitions for a PUSCH transmission in the first 12 symbols. A DCI format scheduling a PDSCH reception by the UE can indicate a set of UE two resources for a PUCCH transmission that includes corresponding HARQ-ACK information in a slot. A first resource can be over a set of symbols from the first 12 symbols of the slot and a second resource can be over one or both of the last 2 symbols of the slot.

When the UE transmits PUSCH in the slot, the UE can transmit the PUCCH using the resource in the last 2 symbols of the slot. When the UE does not transmit PUSCH in the slot, the UE can transmit the PUCCH using the resource in the set of symbols from the first 12 symbols of the slot.

Figure 17:
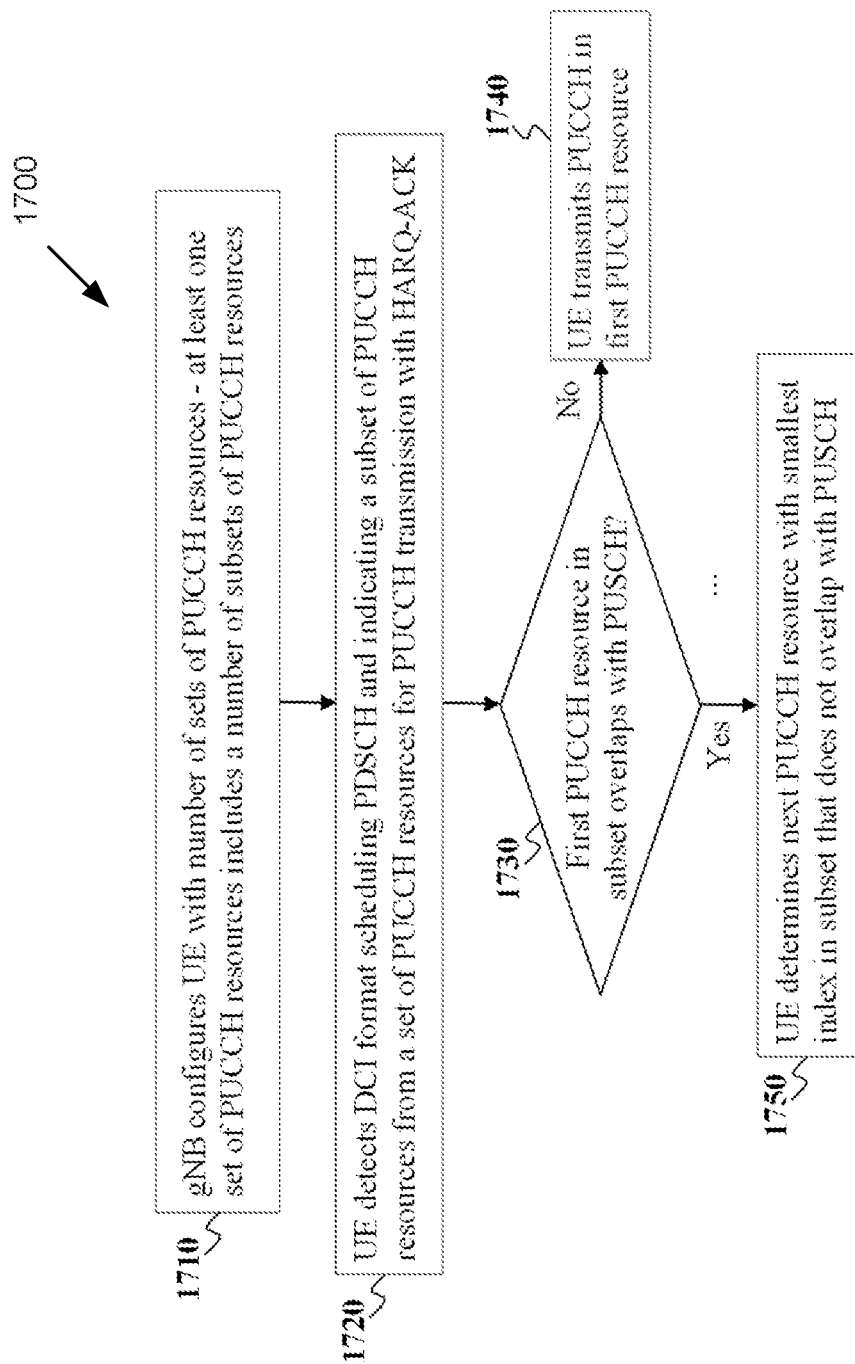
FIG. 17 illustrates an example process for a UE to select a resource for a PUCCH transmission according to embodiments of the present disclosure.

FIG. 17 illustrates an example process 1700 for a UE to select a resource for a PUCCH transmission according to embodiments of the present disclosure. An embodiment of the process 1700 shown in FIG. 17 is for illustration only.

One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

A gNB configures a UE with a number of one or more sets of PUCCH resources where at least one set of PUCCH resources includes a number of subsets of PUCCH resources 1710. The gNB can provide separate configurations for sets of PUCCH resources for different payload ranges of HARQ-ACK information bits. The UE detects a DCI format scheduling a PDSCH reception that includes a transport block where the DCI format includes a field indicating a subset of PUCCH resources from the set of PUCCH resources for the UE to transmit a PUCCH providing HARQ-ACK information in response to the transport block reception 1720.

When the UE does not transmit PUSCH overlapping with a first PUCCH resource in the subset of PUCCH resources 1730, the UE transmits the PUCCH in the first resource from the subset of PUCCH resources 1740. When the UE transmits PUSCH overlapping in time with the first PUCCH resource from the subset of PUCCH resources, the UE determines the next PUCCH resource with the lowest index from the subset of PUCCH resources that does not overlap with the PUSCH and transmits the PUCCH 1750. When all PUCCH resources from the subset of PUCCH resources overlap in time with the PUSCH, the UE can either drop the PUCCH transmission or the PUSCH transmission, for example as previously described in this disclosure.

Figure 18:
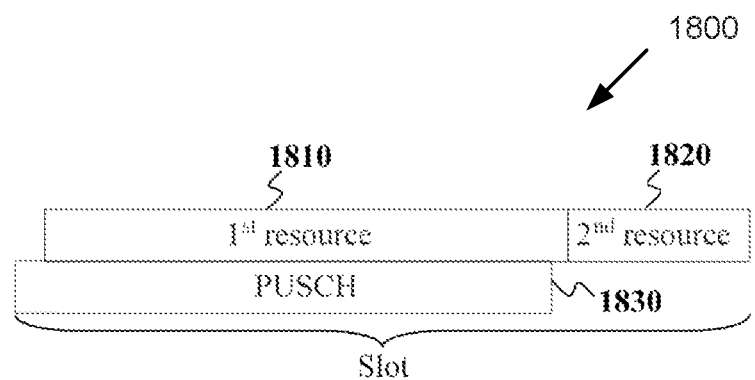
FIG. 18 illustrates an example realization for a UE process for selecting a resource for a PUCCH transmission according to embodiments of the present disclosure.

FIG. 18 illustrates an example realization for a UE process 1800 for selecting a resource for a PUCCH transmission according to embodiments of the present disclosure. An embodiment of the UE process 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

A UE detects a DCI format that schedules a PDSCH reception and indicates a subset of PUCCH resources in a PUCCH resource set that the UE determines based on a payload of HARQ-ACK information bits for transmission at a corresponding time unit. The subset of PUCCH resources includes a first resource 1810 and a second resource 1820. The UE has a PUSCH transmission 1830 that overlaps with the first PUCCH resource. Instead of the first PUCCH resource, the UE selects the second PUCCH resource for HARQ-ACK transmission.

DTX Detection for HARQ-ACK in a PUSCH.

A capability for reliable PDCCH DTX detection needs to also be provided when the UE multiplexes HARQ-ACK in a PUSCH transmission. For example, a gNB can target a first BLER for a first transmission of a transport block to a UE and, when the gNB detects PUCCH DTX, the gNB can target a second BLER for a second transmission of the transport block to the UE.

The first BLER can be larger than the second BLER as the gNB can determine that the UE did not receive the first transmission of the transport block and the second transmission of the transport block needs to be reliable as, due to latency constraints, an additional transmission may not be possible. However, when the UE does not detect the DCI format, the UE transmits data symbols in REs where the gNB expects HARQ-ACK information to be multiplexed. Then the gNB may not be able to reliably detect PDCCH DTX detection.

For example, the data symbols can have a majority of values corresponding to ACK transmission or a majority of values corresponding to NACK transmission and then the gNB is likely to detect ACK or NACK, respectively, instead of DTX as, unlike PDCCH DTX detection when HARQ-ACK information is transmitted in a PUCCH, all REs in a PUSCH convey actual signal transmission with non-zero power.

A first approach for improving PDCCH DTX detection reliability when a gNB expects a UE to transmit HARQ-ACK information in a PUSCH is to reserve a number of REs for HARQ-ACK multiplexing. For example, the number of REs can be determined and correspond to 2 HARQ-ACK information bits or, to minimize a number of reserved REs for HARQ-ACK multiplexing, this number of REs can correspond to 1 HARQ-ACK information bit, or the number of HARQ-ACK bits corresponding to a number of reserved REs can be provided to the UE by higher layer signaling.

When the UE transmits HARQ-ACK information in the PUSCH, the UE can use the reserved REs to map HARQ-ACK information. When the number of REs for mapping HARQ-ACK information is smaller than the reserved number of REs, for example when the HARQ-ACK information is one bit and the reserved REs correspond to two HARQ-ACK information bits, the UE can map a NACK value (such as a binary 0), or an ACK value (such as a binary 1), in the remaining REs or transmit random data to represent repetitions for the second HARQ-ACK bit.

When the UE does not transmit HARQ-ACK information in the PUSCH, the UE repeats a transmission of a hypothetical first HARQ-ACK bit by repeating a transmission of a series of alternating ACK and NACK values (or NACK and ACK) values in pairs of $\{1, 0\}$ (or $\{0, 1\}$) of binary values. The UE can apply the same pattern for repetitions of a hypothetical second HARQ-ACK bit when there is no actual second HARQ-ACK bit. The pattern of repetitions for a pair of $\{1, 0\}$ (or $\{0, 1\}$) binary values representing two repetitions of a HARQ-ACK information bit can be viewed as an explicit signaling of a PDCCH DTX state by the UE.

If a total number of pairs of $\{1, 0\}$ values is N, it is also possible for the UE to transmit $\{1, 1\}$ values for first M<N pairs and transmit $\{1, 0\}$ values for the remaining N−M pairs where a value of M can be provided to the UE by higher layers either as an absolute number or as a percentage/fraction of N (a floor or ceiling function can then apply for determining the value of M after multiplying the value of the higher layer parameter with the value of N). A reason is to improve reception reliability for a NACK value that is represented by a binary 0 and to enable the gNB to control a probability for a DTX-to-ACK error. Similar, if improved reception reliability for an ACK value is to be provided, the UE can transmit $\{0, 0\}$ values for first M<N pairs and transmit $\{1, 0\}$ values for the remaining N−M pairs.

Alternatively, the UE transmits a NACK value for a HARQ-ACK information bit unless the UE correctly decoded a transport block corresponding to the HARQ-ACK information bit and then the UE transmits an ACK value (such as a binary 1). In this case, the gNB cannot differentiate a NACK event corresponding to an incorrect decoding of a transport block by the UE from a DTX event corresponding to a transport block the UE did not receive.

A second approach for improving PDCCH DTX detection reliability when a gNB expects a UE to transmit HARQ-ACK information in a PUSCH is to explicitly transmit a DTX state, in addition to an ACK state or a NACK state when the UE has HARQ-ACK information in response to a transport block reception, when the UE transmits a PUSCH. For example, for reserved REs corresponding to 2 HARQ-ACK information bits, the UE can convey 8 states, instead of 4 states, and include the {ACK, DTX}, {NACK, DTX}, {DTX, ACK}, {DTX, NACK} in addition to the {ACK, ACK}, {ACK, NACK}, {NACK, ACK} and {NACK, NACK} states. In this case, the {DTX, DTX} state is not included as a probability that a UE fails to detect 2 DCI formats in corresponding 2 PDCCH reception is assumed materially negligible.

A third approach is for a gNB to avoid having to perform PDCCH DTX detection when the gNB expects HARQ-ACK to be transmitted in a PUSCH and configure the UE to not multiplex HARQ-ACK information in a PUSCH, drop the PUSCH transmission, and transmit HARQ-ACK information in a PUCCH, as described in the first embodiment of the disclosure. Then, the gNB can perform PDCCH DTX detection through a PUCCH DTX detection by measuring received signal energy in a corresponding PUCCH resource.

Figure 19:
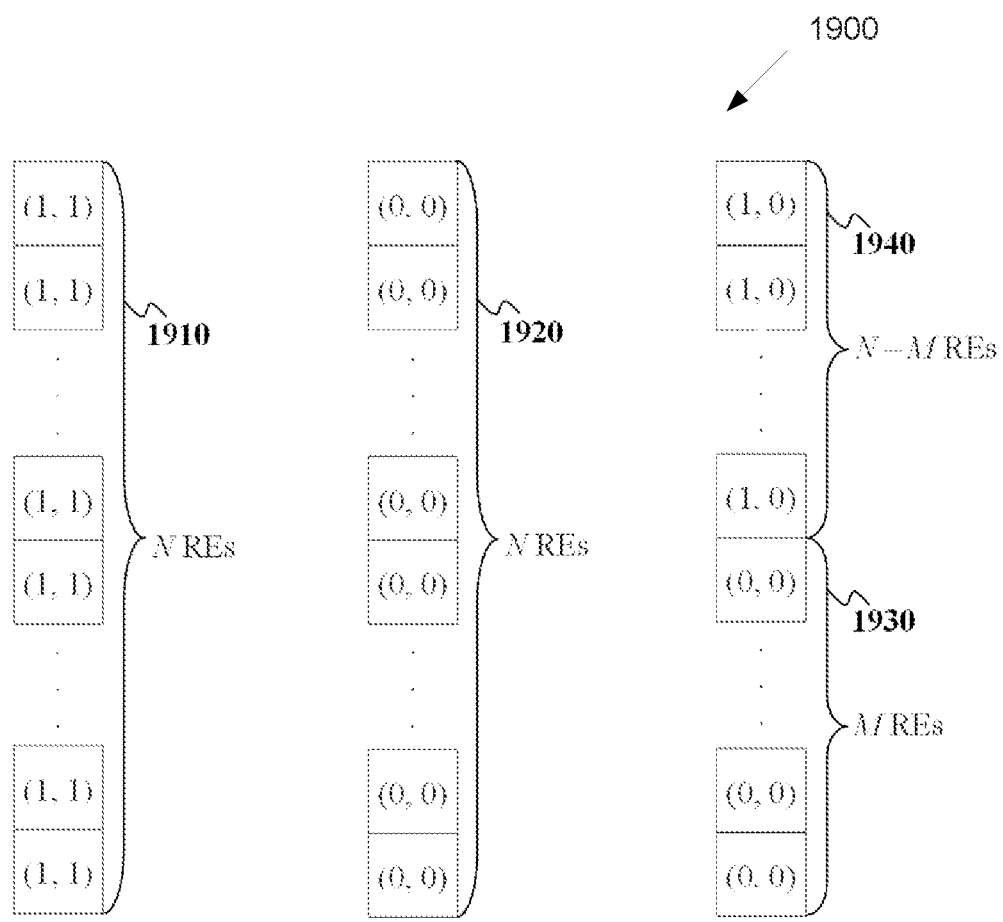
FIG. 19 illustrates an example process for a UE to transmit information bits in REs reserved for HARQ-ACK transmission according to embodiments of the present disclosure.

FIG. 19 illustrates an example process 1900 or a UE to transmit information bits in REs reserved for HARQ-ACK transmission according to embodiments of the present disclosure. An embodiment of the process 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

A UE determines a number of reserved REs corresponding to a predetermined or configured number of HARQ-ACK information bits such as 1 or 2 HARQ-ACK information bits. The UE maps only HARQ-ACK information in the reserved REs and does not map any other information type.

For N of the reserved REs and, for example, assuming transmission of one HARQ-ACK bit and QPSK modulation, when the UE transmits an ACK value, the UE maps N QPSK modulation symbols with value (1, 1) in the reserved REs 1910. When the UE transmits a NACK value, the UE maps N QPSK modulation symbols with value (0, 0) in the reserved REs 1920. When the UE transmits a DTX value, the UE maps M QPSK modulation symbols with value (0, 0) in M of the reserved REs 1930 and maps N–M QPSK modulation symbols with value (1, 0) (or (0, 1)) in the remaining N–M reserved REs 1940.

The value of M can be provided to the UE by higher layer signaling and can be represented as a percentage/fraction of the value of N (M is obtained by applying a ceiling or a floor function to the product of the higher layer parameter value with the value of N). The mapping of the M QPSK modulation symbols with value (0, 0) and of the N–M QPSK modulation symbols with value (1, 0) to reserved REs is exemplary and any other mapping can also apply such as for example an interleaves mapping with equal spacing of the M REs within the N REs. It is also possible that M=0 or M=floor(N/2) or M=ceil(N/2), by default in the system operation.

HARQ-ACK transmission in response to multiple receptions of the same transport block.

A BLER for a reception of a transport block by a UE can improve by scheduling and transmitting the transport block from multiple transmission points. For example, a UE can be configured to decode PDCCH candidates in multiple control resource sets with same or different TCI state configuration in at least two of the multiple control resource sets. The decoding of the PDCCH candidates can be over same symbols of a slot or over different symbols of a slot or over different slots.

Assuming for simplicity two control resource sets with different TCI state configurations, a UE can detect first and second DCI formats in respective first and second PDCCH receptions in respective first and second control resource sets scheduling the same transport block in respective first and second PDSCH receptions. The UE can also be provided by higher layer signaling first one or more sets of PUCCH resources associated with a first TCI state configuration for PUCCH transmission to convey first HARQ-ACK information corresponding to PDSCH receptions scheduled by DCI formats in PDCCH reception in the first CORESET and second one or more sets of PUCCH resources associated with a second TCI state configuration, that is same or different than the first TCI state configuration, for PUCCH transmission to convey second HARQ-ACK information corresponding to PDSCH receptions scheduled by DCI formats in PDCCH reception in the second CORESET.

When the UE does not have a capability for simultaneous PUCCH transmissions with different TCI states, the UE transmits HARQ-ACK information in a first PUCCH with the first TCI state and transmits HARQ-ACK information in a second PUCCH with the second TCI state when the two PUCCH transmissions do not overlap in time (as determined by a PUCCH transmission timing field in respective DCI formats).

Otherwise, when the first and second PUCCH transmissions overlap in time, it can either be up to the UE implementation to select the PUCCH to transmit, or the UE can transmit the PUCCH associated with PDCCH received in the control resource set with the smaller index from the two control resource sets, or the UE can be configured by the gNB a single TCI state for a PUCCH transmission with the first and second HARQ-ACK information (instead of two separate PUCCH transmissions), or the UE can be configured to transmit the PUCCH corresponding to the PDCCH that is received with the larger power between the first and second PDCCH receptions.

When the UE has a capability for simultaneous PUCCH transmissions with different TCI states, the UE transmits both the first and second PUCCH.

The DCI formats scheduling corresponding PDSCH receptions in non-overlapping RBs or partially overlapping RBs that include the same transport block (on the same cell), for example as identified by the same value for a HARQ process number field in the DCI formats and the same or different value for a redundancy version field, can indicate through an associated field the same PUCCH resource for the UE to transmit HARQ-ACK information corresponding to the transport block. Then, the UE generates a single HARQ-ACK information bit with a value of ACK when the UE correctly decodes the transport block in at least one PDSCH reception or with a value of NACK when the UE does not correctly decode the transport block in any of the PDSCH receptions.

PDSCH receptions conveying the same transport block can be scheduled on different cells when a UE is capable of DL carrier aggregation (CA). Then, in addition to using the same HARQ process number value in DCI formats scheduling the PDSCH receptions, either the transport block can include higher layer information indicating that is same or, to enable combining of log-likelihood metrics before decoding of the transport block, the DCI format can include a 1-bit field indicating whether or not, for the HARQ process number, the same transport block is received on different cells.

Figure 20:
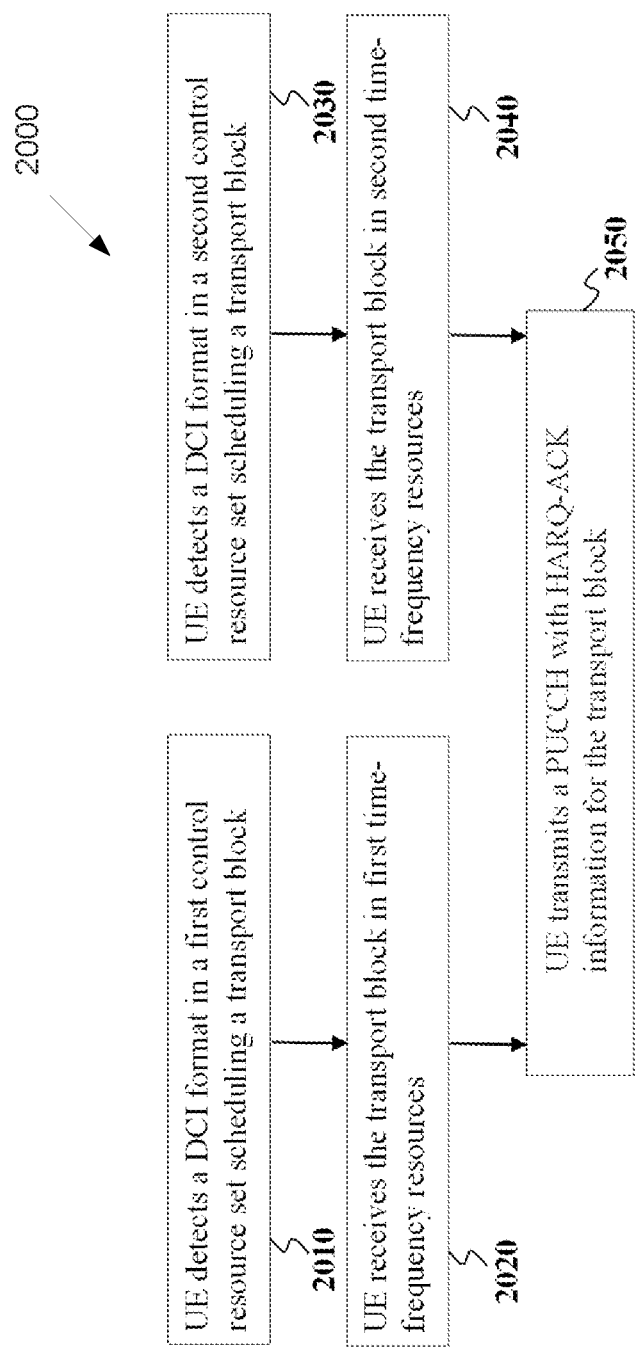
FIG. 20 illustrates an example process for a UE to receive a transport block in multiple PDSCH receptions and transmit corresponding HARQ-ACK information in a PUCCH according to embodiments of the present disclosure.

FIG. 20 illustrates an example process 2000 for a UE to receive a transport block in multiple PDSCH receptions and transmit corresponding HARQ-ACK information in a PUCCH according to embodiments of the present disclosure. An embodiment of the process 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

A gNB transmits and a UE detects a DCI format in a first control resource set scheduling a transport block in first time-frequency resources 2010. The gNB transmits and the UE detects a DCI format in a second control resource set scheduling the transport block in second time-frequency resources 2020. The first DCI format and the second DCI format include a HARQ process number field with same value.

When the first DCI format and the second DCI format include a redundancy version field, the field can have same or different value. The UE receives the transport block in the first time-frequency resources 2030 and in the second time-frequency resources 2040. The UE can perform separate decoding for the transport block in the first time-frequency resources and in the second time-frequency resources or the UE can combine the log-likelihood metrics and perform a single decoding. The UE generates a single HARQ-ACK information bit in response to the transport block decoding and transmits a PUCCH providing the HARQ-ACK information bit 2050.

A target BLER for data or control information depends on a corresponding reception power or, by compensating for path-loss, fading, and interference, on a corresponding transmission power. When a UE has multiple simultaneous PUSCH or PUCCH transmissions, such as for example when the UE operates with carrier aggregation, and a total power determined by the UE for the multiple PUSCH or PUCCH transmissions exceeds a maximum power available at the UE, the UE prioritizes power allocation according to the information type.

For example, at least for the same information type, the UE can prioritize PUSCH or PUCCH transmissions scheduled by respective DCI formats that include a first RNTI over PUSCH or PUCCH transmissions scheduled by respective DCI formats that include a second RNTI. Further, as part of a configuration for an SRS transmission, a gNB can configure the UE whether or not to prioritize power allocation to the SRS transmission over PUSCH or PUCCH transmissions that are scheduled by respective DCI formats that include a second RNTI. Power allocation to a PRACH transmission can be prioritized over all other transmissions or only over transmissions associated with second DCI formats such as ones with CRC scrambled by a second RNTI.

Figure 21:
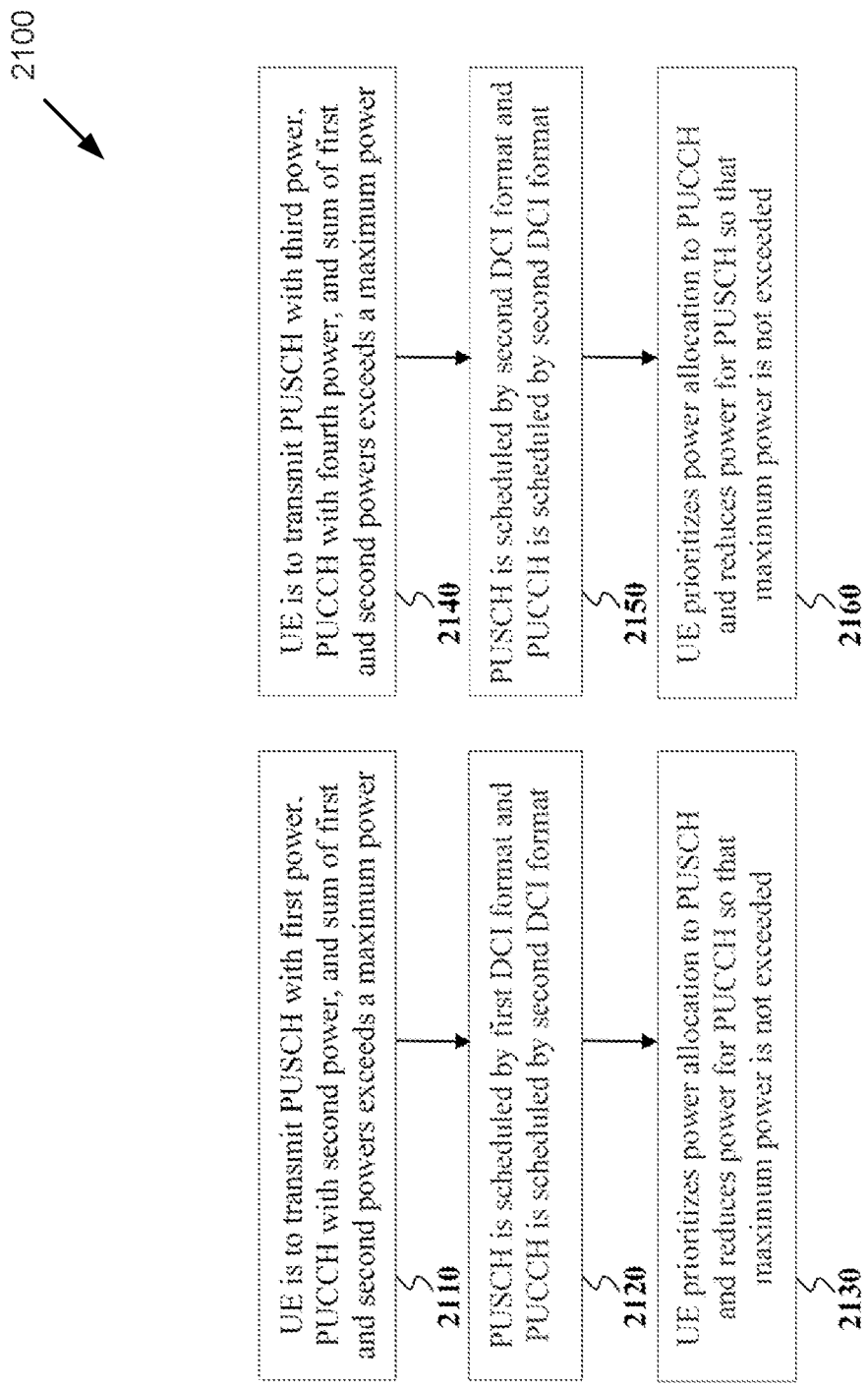
FIG. 21 illustrates an example process for a UE to allocate power for transmission of different channels according to embodiments of the present disclosure.

FIG. 21 illustrates an example process 2100 for a UE to allocate power for transmission of different channels according to embodiments of the present disclosure. An embodiment of the process 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

At a first time, a UE is scheduled to transmit a PUSCH with a first power and a PUCCH with a second power and the sum of the first and second powers exceeds a maximum transmission power at the first time 2110. The UE determines that the PUSCH that includes only data information was scheduled by a first DCI format, or by a DCI format with a first RNTI, or by a first configuration and the PUCCH was scheduled/triggered by a second DCI format, or by a DCI format with a second RNTI, or by a second configuration 2120.

The UE prioritizes power allocation to the PUSCH and reduces a power for the PUCCH transmission, including dropping the PUCCH transmission, so that the maximum power is not exceeded 2130. At a second time, a UE is scheduled to transmit a PUSCH with a third power and a PUCCH with a fourth power and the sum of the third and fourth powers exceeds a maximum transmission power at the second time 2140.

The UE determines that the PUSCH that includes only data information was scheduled by a second DCI format, or by a DCI format with a second RNTI, or by a second configuration and the PUCCH was scheduled/triggered by a second DCI format, or by a DCI format with the second RNTI, or by a second configuration 2150. The UE prioritizes power allocation to the PUCCH and reduces a power for the PUSCH transmission, including dropping the PUSCH transmission, so that the maximum power is not exceeded 2160.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method performed by a user equipment (UE), the method comprising:
receiving, from a base station (BS), information for a first code rate and for a second code rate;
determining a first number of resource elements (REs) for multiplexing first acknowledgement information in a physical uplink control channel (PUCCH) based on:
the first code rate when second acknowledgement information is not multiplexed in the PUCCH, and
the second code rate when the second acknowledgement information is multiplexed in the PUCCH;
multiplexing the first acknowledgement information in the PUCCH; and
transmitting, to the BS, the PUCCH.

2. The method of claim 1, further comprising:
receiving information for a third code rate;
determining a second number of REs for multiplexing the second acknowledgement information in the PUCCH based on the third code rate; and
multiplexing the second acknowledgement information in the PUCCH.

3. The method of claim 2, further comprising:
determining:
   a third number of REs equal to a sum of the first number of REs and the second number of REs, and
   a minimum number of resource blocks (RB s) that includes a number of REs that is larger than or equal to the third number of REs; and
transmitting the PUCCH over the minimum number of RBs.

4. The method of claim 2, further comprising:
receiving information for a maximum number of resource blocks (RBs);
determining a third number of REs equal to a sum of the first number of REs and the second number of REs, wherein the third number of REs in larger than a number of REs included in the maximum number of RBs;
multiplexing:
   the second acknowledgement information over the second number of REs from the maximum number of RBs, and
   the first acknowledgement information over remaining REs from the maximum number of RBs after excluding the second number of REs; and
transmitting the PUCCH over the maximum number of RBs.

5. The method of claim 2, further comprising:
receiving:
   information for first values of parameters for determining a first power of a first PUCCH transmission with the first acknowledgement information, and
   information for second values of parameters for determining a second power of a second PUCCH transmission with the second acknowledgement information;
determining a power based on the second values; and
transmitting the PUCCH with the power.

6. The method of claim 2, wherein the first code rate is smaller than the second code rate.

7. The method of claim 1, further comprising:
receiving a downlink control information (DCI) format; and
determining whether acknowledgement information associated with the DCI format is include in the first acknowledgement information or in the second acknowledgement information based on an indication by the DCI format.

8. A user equipment (UE), comprising:
a transceiver configured to receive, from a base station (BS), information for a first code rate and for a second code rate; and
a processor operably coupled to the transceiver, the processor configured to:
   determine a first number of resource elements (REs) for multiplexing first acknowledgement information in a physical uplink control channel (PUCCH) based on:
      the first code rate when second acknowledgement information is not multiplexed in the PUCCH, and
      the second code rate when second acknowledgement information is multiplexed in the PUCCH, and
   multiplex the first acknowledgement information in the PUCCH,
wherein the transceiver is further configured to transmit to the BS, the PUCCH.

9. The UE of claim 8, wherein:
the transceiver is further configured to receive information for a third code rate; and
the processor is further configured to:
   determine a second number of REs for multiplexing the second acknowledgement information in the PUCCH based on the third code rate, and
   multiplex the second acknowledgement information in the PUCCH.

10. The UE of claim 9, wherein:
the processor is further configured to determine:
   a third number of REs equal to a sum of the first number of REs and the second number of REs, and
   a minimum number of resource blocks (RB s) that includes a number of REs that is larger than or equal to the third number of REs; and
the transceiver is further configured to transmit the PUCCH over the minimum number of RBs.

11. The UE of claim 9, wherein:
the transceiver is further configured to receive information for a maximum number of resource blocks (RB s);
the processor is further configured to:
   determine a third number of REs equal to a sum of the first number of REs and the second number of REs, wherein the third number of REs in larger than a number of REs included in the maximum number of RBs, and
   multiplex:
      the second acknowledgement information over the second number of REs from the maximum number of RBs, and
      the first acknowledgement information over remaining REs from the maximum number of RBs after excluding the second number of REs; and
the transceiver is further configured to transmit the PUCCH over the maximum number of RBs.

12. The UE of claim 9, wherein:
the transceiver is further configured to receive:
   information for first values of parameters for determining a first power of a first PUCCH transmission with the first acknowledgement information, and
   information for second values of parameters for determining a second power of a second PUCCH transmission with the second acknowledgement information;
the processor is further configured to determine a power based on the second values; and
the transceiver is further configured to transmit the PUCCH with the power.

13. The UE of claim 9, wherein the first code rate is smaller than the second code rate.

14. The UE of claim 8, wherein:
the transceiver is further configured to receive a downlink control information (DCI) format; and
the processor is further configured to determine whether acknowledgement information associated with the DCI format is included in the first acknowledgement information or in the second acknowledgement information based on an indication by the DCI format.

15. A base station, comprising:
a transceiver configured to transmit, to a user equipment (UE), information for a first code rate and for a second code rate; and
a processor configured to:
   determine a first number of REs for demultiplexing first acknowledgement information from a physical uplink control channel (PUCCH) based on:
      the first code rate when second acknowledgement information is not demultiplexed from the PUCCH, and the second code rate when the second acknowledgement information is demultiplexed from the PUCCH; and demultiplex the first acknowledgement information from the PUCCH, wherein the transceiver is further configured to receive, from the UE, the PUCCH.

16. The base station of claim 15, wherein:

the transceiver is further configured to transmit information for a third code rate; and the processor is further configured to:

determine a second number of REs for demultiplexing the second acknowledgement information from the PUCCH based on the third code rate, and demultiplex the second acknowledgement information from the PUCCH.

17. The base station of claim 16, wherein:

the processor is further configured to determine:

a third number of REs equal to a sum of the first number of REs and the second number of REs, and a minimum number of resource blocks (RB s) that includes a number of REs that is larger than or equal to the third number of REs; and the transceiver is further configured to receive the PUCCH over the minimum number of RBs.

18. The base station of claim 16, wherein:

the transceiver is further configured to transmit information for a maximum number of resource blocks (RB s);

the processor is further configured to:

determine a third number of REs equal to a sum of the first number of REs and the second number of REs, wherein the third number of REs in larger than a number of REs included in the maximum number of RBs, demultiplex:

the second acknowledgement information over the second number of REs from the maximum number of RBs, and the first acknowledgement information over remaining REs from the maximum number of RBs after excluding the second number of REs; and the transceiver is further configured to receive the PUCCH over the maximum number of RBs.

19. The base station of claim 16, wherein the first code rate is smaller than the second code rate.

20. The base station of claim 15, wherein:

the transceiver is further configured to transmit a downlink control information (DCI) format; and the processor is further configured to determine whether acknowledgement information associated with the DCI format is included in the first acknowledgement information or in the second acknowledgement information based on an indication by the DCI format.

* * * * *